United States Patent
Yi et al.

(10) Patent No.: US 10,015,751 B2
(45) Date of Patent: *Jul. 3, 2018

(54) METHOD AND APPARATUS FOR CONTROLLING UPLINK POWER IN WIRELESS

(71) Applicant: LG ELECTRONICS INC., Seoul (KR)

(72) Inventors: Yunjung Yi, Seoul (KR); Joonkui Ahn, Seoul (KR); Daesung Hwang, Seoul (KR); Suhwan Lim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/713,423

(22) Filed: Sep. 22, 2017

(65) Prior Publication Data

US 2018/0014256 A1  Jan. 11, 2018

Related U.S. Application Data

(63) Continuation of application No. 15/113,396, filed as application No. PCT/KR2015/001396 on Feb. 11, 2015, now Pat. No. 9,801,140.
(Continued)

(51) Int. Cl.
*H04B 7/00* (2006.01)
*H04W 52/14* (2009.01)
(Continued)

(52) U.S. Cl.
CPC ......... *H04W 52/146* (2013.01); *H04W 52/36* (2013.01); *H04W 52/40* (2013.01); *H04W 52/365* (2013.01); *H04W 52/367* (2013.01)

(58) Field of Classification Search
USPC ............... 455/522, 69–70; 370/310–320
See application file for complete search history.

(56) References Cited

U.S. PATENT DOCUMENTS 9,642,121 B2 * 5/2017 Song ................. H04W 72/0406
9,801,140 B2  10/2017 Yi et al.
(Continued)

OTHER PUBLICATIONS

Panasonic, "Uplink transmission power management and PHR reporting for dual connectivity", 3GPP TSG RAN WG2 Meeting #84, R2-133945, Nov. 1, 2013, 3 pages.
(Continued)

*Primary Examiner* — Fayyaz Alam
(74) *Attorney, Agent, or Firm* — Lee, Hong, Degerman, Kang & Waimey PC

(57) ABSTRACT

Descriptions on the method and the apparatus for controlling uplink transmission power are provided. The method for controlling uplink transmission power comprises receiving a signal on a downlink channel, wherein the signal includes information on transmission power which indicates a power control mode, determining whether primary cell (PCell) and secondary cell (SCell) are asynchronous or synchronous, determining maximum transmission power for the SCell, using the information on transmission power, based on whether the PCell and the SCell are asynchronous or synchronous, and transmitting signal to the SCell based on the maximum transmission power for the SCell.

16 Claims, 17 Drawing Sheets

Related U.S. Application Data

(60) Provisional application No. 61/938,147, filed on Feb. 11, 2014, provisional application No. 61/981,170, filed on Apr. 17, 2014, provisional application No. 61/984,030, filed on Apr. 24, 2014, provisional application No. 62/009,311, filed on Jun. 8, 2014, provisional application No. 62/014,120, filed on Jun. 19, 2014, provisional application No. 62/015,505, filed on Jun. 22, 2014, provisional application No. 62/033,630, filed on Aug. 5, 2014, provisional application No. 62/045,014, filed on Sep. 3, 2014, provisional application No. 62/049,348, filed on Sep. 11, 2014, provisional application No. 62/052,454, filed on Sep. 18, 2014.

(51) Int. Cl.
*H04W 52/40* (2009.01)
*H04W 52/36* (2009.01)

(56) References Cited

U.S. PATENT DOCUMENTS

| | | | |
|---|---|---|---|
| 2014/0349701 A1* | 11/2014 | Vajapeyam | H04W 52/32 455/522 |
| 2015/0208366 A1* | 7/2015 | Papasakellariou | H04W 52/244 370/311 |
| 2015/0215874 A1* | 7/2015 | Chen | H04W 52/18 455/522 |
| 2015/0350882 A1* | 12/2015 | Uchino | H04W 8/24 370/329 |
| 2016/0081071 A1* | 3/2016 | Song | H04L 1/00 370/280 |
| 2016/0205632 A1* | 7/2016 | Yi | H04W 52/146 455/522 |
| 2016/0323805 A1* | 11/2016 | Ryu | H04W 36/0055 |
| 2017/0013565 A1* | 1/2017 | Pelletier | H04W 52/146 |

OTHER PUBLICATIONS

Ericsson, "Considerations on power control for Dual Connectivity", 3GPP TSG RAN WG2 #84, Tdoc R2-134234, Nov. 2, 2013, 4 pages.

Pantech, "Challenge on UL transmission of dual connectivity", 3GPP TSG-RAN WG2 Meeting #83, R2-132504, Aug. 9, 2013, 8 pages.

LG Electronics Inc., "Management of UE Transmit Power in Dual Connectivity", 3GPP TSG-RAN WG2 Meeting #84, R2-134048, Nov. 1, 2013, 2 pages.

* cited by examiner

METHOD AND APPARATUS FOR CONTROLLING UPLINK POWER IN WIRELESS

CROSS-REFERENCE TO RELATED APPLICATIONS

This application is a continuation of U.S. patent application Ser. No. 15/113,396, filed on Jul. 21, 2016, now U.S. Pat. No. 9,801,140, which is the National Stage filing under 35 U.S.C. 371 of International Application No. PCT/KR2015/001396, filed on Feb. 11, 2015, which claims the benefit of U.S. Provisional Application No. 61/938,147, filed on Feb. 11, 2014, 61/981,170, filed on Apr. 17, 2014, 61/984,030, filed on Apr. 24, 2014, 62/009,311, filed on Jun. 8, 2014, 62/014,120, filed on Jun. 19, 2014, 62/015,505, filed on Jun. 22, 2014, 62/033,630, filed Aug. 5, 2014, 62/045,014, filed on Sep. 3, 2014, 62/049,348, filed on Sep. 11, 2014 and 62/052,454, filed on Sep. 18, 2014, the contents of which are all hereby incorporated by reference herein in their entirety.

TECHNICAL FIELD

The present invention relates to wireless communications, and more particularly, to a method and apparatus for controlling an uplink power in a wireless communication system.

BACKGROUND ART

Universal mobile telecommunications system (UMTS) is a $3^{rd}$ generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the $3^{rd}$ generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

To increase the capacity for the users' demand of services, increasing the bandwidth may be essential, a carrier aggregation (CA) technology or resource aggregation over intra-node carriers or inter-node carriers aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). For inter-node resource aggregation, for each node, carrier group (CG) can be established here one CG can have multiple CCs. Each CC is defined by a single bandwidth and a center frequency.

In LTE Rel-12, a new study on small cell enhancement has started, where dual connectivity is supported. Dual connectivity is an operation where a given UE consumes radio resources provided by at least two different network points (master eNB (MeNB) and secondary eNB (SeNB)) connected with non-ideal backhaul while in RRC_CONNECTED. Furthermore, each eNB involved in dual connectivity for a UE may assume different roles. Those roles do not necessarily depend on the eNB's power class and can vary among UEs.

Uplink power control determines the average power over a single carrier frequency division multiple access (SC-FDMA) symbol in which the physical channel is transmitted. Uplink power control controls the transmit power of the different uplink physical channels. Efficient uplink power control method for CA or dual connectivity may be required.

SUMMARY OF INVENTION

Technical Problem

The present invention provides a method and apparatus for reporting PHR efficiently depending on whether MeNB and SeNB are asynchronous or synchronous.

The present invention provides a method and apparatus for determining maximum transmission power efficiently when MeNB and SeNB are asynchronous or synchronous considering overlapped portions between subframes of the MeNB and subframes of the SeNB.

The present invention provides a method and apparatus for determining maximum transmission power of SeNB efficiently considering used transmission power at previous subframe of MeNB.

The present invention provides a method and apparatus for determining MeNB and SeNB are synchronous or asynchronous.

Technical Solution

An embodiment of the present invention is a method of controlling uplink transmission power in wireless communication system. This method may comprise receiving a signal on a downlink channel, wherein the signal includes information on transmission power which indicates a power control mode, determining whether primary cell (PCell) and secondary cell (SCell) are asynchronous or synchronous, determining maximum transmission power for the SCell, using the information on transmission power, based on whether the PCell and the SCell are asynchronous or synchronous, and transmitting signal to the SCell based on the maximum transmission power for the SCell.

Another embodiment of the present invention is an apparatus for controlling uplink (UL) transmission power in wireless communication system. This apparatus may comprise a radio frequency (RF) unit for transmitting and receiving a radio signal, wherein the radio signal includes information on transmission power which indicates a power control mode, and a processor operatively coupled to the RF unit. The processor may be configured for transmitting signals via the RF unit based on a scheduling for UL and/or downlink (DL). The processor may determine whether primary cell (PCell) and secondary cell (SCell) are asynchronous or synchronous, and may determine maximum transmission power for SCell, using the information on transmission power, based on whether the PCell and the SCell are asynchronous or synchronous. The RF unit may transmit radio signal to the SCell based on the maximum transmission power for the SCell.

Advantageous Effects

According to the present invention, power headroom can be determined efficiently depending on whether MeNB and SeNB are asynchronous or synchronous.

According to the present invention, maximum transmission power can be determined efficiently considering overlapped portions between subframes of the MeNB and subframes of the SeNB or considering used transmission power at previous subframe of MeNB.

According to the present invention, it is determined efficiently whether MeNB and SeNB are synchronous or asynchronous and parameter values for the transmission power can be determined using whether MeNB and SeNB are synchronous or asynchronous.

MODE FOR INVENTION

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink and employs the SC-FDMA in uplink. LTE-advance (LTE-A) is an evolution of the 3GPP LTE. For clarity, this application focuses on the 3GPP LTE/LTE-A. However, technical features of the present invention are not limited thereto.

Figure 1:
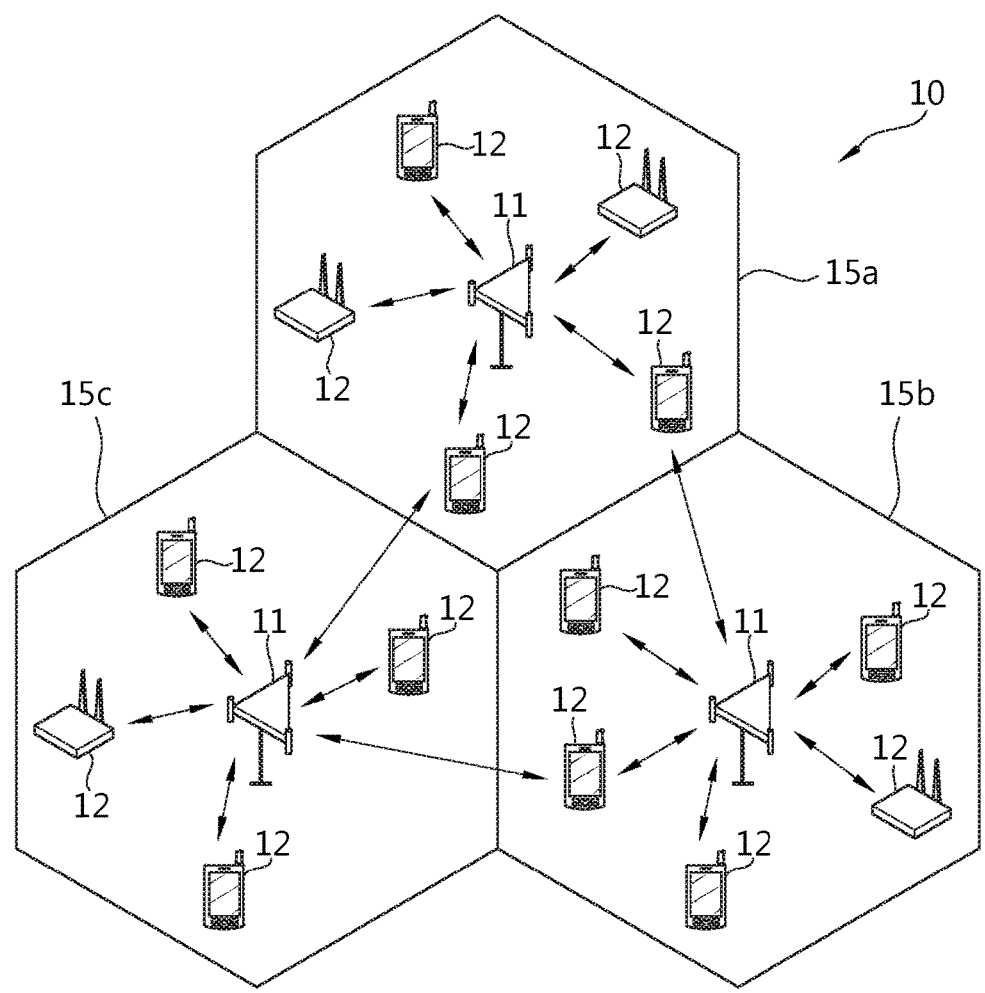
FIG. 1 shows a wireless communication system.

FIG. 1 shows a wireless communication system. The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The BS 11 generally refers to a fixed station that communicates with the UE 12 and may be called by other names such as evolved-NodeB (eNB), base transceiver system (BTS), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
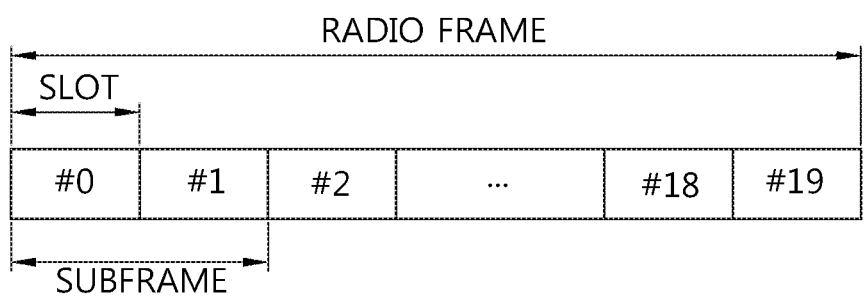
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in time domain. Since the 3GPP LTE uses the OFDMA in the downlink, the OFDM symbol is for representing one symbol period. The OFDM symbols may be called by other names depending on a multiple-access scheme. For example, when SC-FDMA is in use as an uplink multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

3GPP LTE defines that one slot includes seven 01-DM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE cannot be simultaneously performed. In a TDD system in which an uplink transmission and a downlink transmission are discriminated in units of subframes, the uplink transmission and the downlink transmission are performed in different subframes.

Frame structure type 1 is applicable to both full duplex and half duplex FDD. Each radio frame is $T_f=307200 \times T_s=10$ ms long and consists of 20 slots of length $T_{slot}=15360 \times T_s=0.5$ ms, numbered from 0 to 19. A subframe is defined as two consecutive slots where subframe i consists of slots 2i and 2i+1.

For FDD, 10 subframes are available for downlink transmission and 10 subframes are available for uplink transmissions in each 10 ms interval. Uplink and downlink transmissions are separated in the frequency domain. In half-duplex FDD operation, the UE cannot transmit and receive at the same time while there are no such restrictions in full-duplex FDD.

Frame structure type 2 is applicable to TDD. Each radio frame of length $T_f=307200 \times T_s=10$ ms consists of two half-frames of length $153600 \times T_s=5$ ms each. Each half-frame consists of five subframes of length $30720 \times T_s=1$ ms. The supported uplink-downlink configurations are listed in Table 1.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, for each subframe in a radio frame, "D" denotes the subframe is reserved for downlink transmissions, "U" denotes the subframe is reserved for uplink transmissions and "S" denotes a special subframe with the three fields downlink pilot time slot (DwPTS), guard period (GP) and uplink pilot time slot (UpPTS). Each subframe i is defined as two slots, 2i and 2i+1 of length $T_{slot}=15360 \times T_s=0.5$ ms in each subframe.

Uplink-downlink configurations with both 5 ms and 10 ms downlink-to-uplink switch-point periodicity are supported. In case of 5 ms downlink-to-uplink switch-point periodicity, the special subframe exists in both half-frames. In case of 10 ms downlink-to-uplink switch-point periodicity, the special subframe exists in the first half-frame only. Subframes 0 and 5 and DwPTS are always reserved for downlink transmission. UpPTS and the subframe immediately following the special subframe are always reserved for uplink transmission.

In case multiple cells are aggregated, the UE may assume that the guard period of the special subframe in the different cells have an overlap of at least $1456 \times T_s$. In case multiple cells with different uplink-downlink configurations are aggregated and the UE is not capable of simultaneous reception and transmission in the aggregated cells, the following constraints apply:

if the subframe in the primary cell is a downlink subframe, the UE shall not transmit any signal or channel on a secondary cell in the same subframe
  if the subframe in the primary cell is an uplink subframe, the UE is not expected to receive any downlink transmissions on a secondary cell in the same subframe
  if the subframe in the primary cell is a special subframe and the same subframe in a secondary cell is a downlink subframe, the UE is not expected to receive physical downlink shared channel (PDSCH)/enhanced physical downlink control channel (EPDCCH)/physical multicast channel (PMCH)/positioning reference signal (PRS) transmissions in the secondary cell in the same subframe, and the UE is not expected to receive any other signals on the secondary cell in OFDM symbols that overlaps with the guard period or UpPTS in the primary cell.

Figure 3:
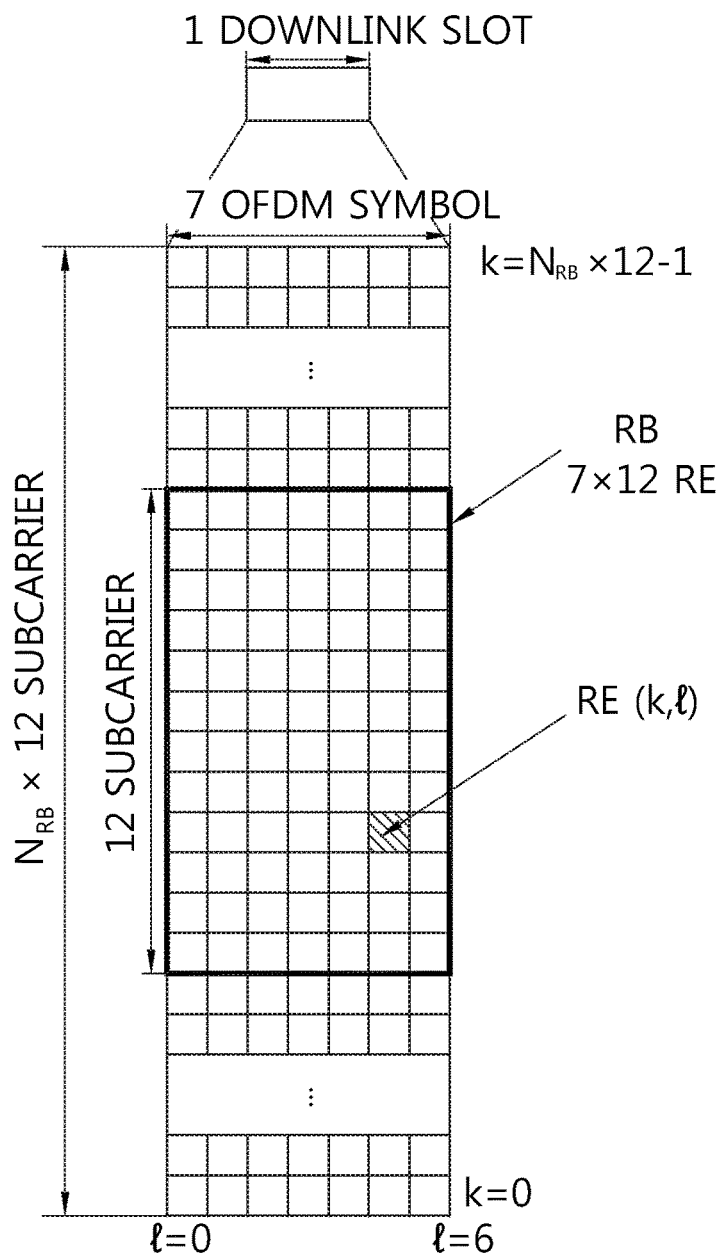
FIG. 3 shows a resource grid for one downlink slot.

FIG. 3 shows a resource grid for one downlink slot. Referring to FIG. 3, a downlink slot includes a plurality of OFDM symbols in time domain. It is described herein that one downlink slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the downlink slot depends on a downlink transmit bandwidth. The structure of an uplink slot may be same as that of the downlink slot.

The number of OFDM symbols and the number of subcarriers may vary depending on the length of a CP, frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
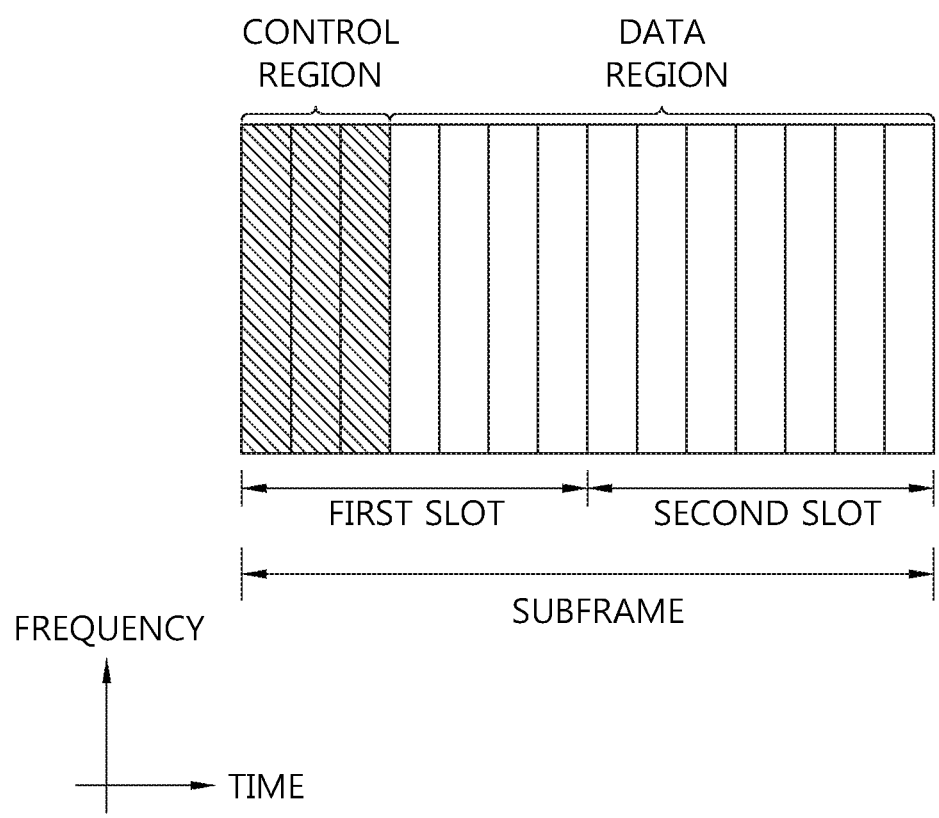
FIG. 4 shows structure of a downlink subframe.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared channel (PDSCH). Examples of downlink control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/non-acknowledgment (NACK) signal. Control information transmitted through the PDCCH is referred to as downlink control information (DCI). The DCI includes uplink or downlink scheduling information or includes an uplink transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The BS determines a PDCCH format according to a DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 5:
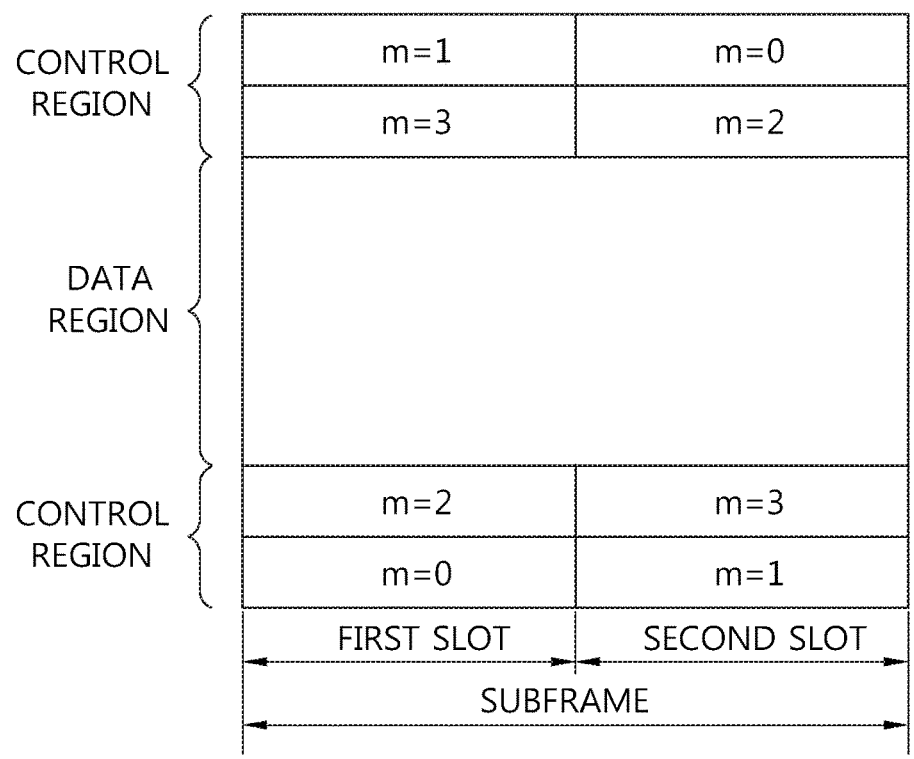
FIG. 5 shows structure of an uplink subframe.

FIG. 5 shows structure of an uplink subframe. Referring to FIG. 5, an uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting uplink control information through different subcarriers according to time.

Uplink control information transmitted on the PUCCH may include a hybrid automatic repeat request (HARQ) acknowledgement/non-acknowledgement (ACK/NACK), a channel quality indicator (CQI) indicating the state of a downlink channel, a scheduling request (SR), and the like.

The PUSCH is mapped to an uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

Carrier aggregation (CA) is described. It may be referred to Section 5.5 of 3GPP TS 36.300 V11.6.0 (2013-06).

In CA, two or more component carriers (CCs) are aggregated in order to support wider transmission bandwidths up to 100 MHz or more. A UE may simultaneously receive or transmit on one or multiple CCs depending on its capabilities. A UE with single timing advance capability for CA can simultaneously receive and/or transmit on multiple CCs corresponding to multiple serving cells sharing the same timing advance (multiple serving cells grouped in one timing advance group (TAG)). A UE with multiple timing advance capability for CA can simultaneously receive and/or transmit on multiple CCs corresponding to multiple serving cells with different timing advances (multiple serving cells grouped in multiple TAGs). E-UTRAN ensures that each TAG contains at least one serving cell. A non-CA capable UE can receive on a single CC and transmit on a single CC corresponding to one serving cell only (one serving cell in one TAG).

A serving cell is combination of downlink and optionally uplink resources. That is, a serving cell may consist of one DL CC and one UL CC. Alternatively, a serving cell may consist of one DL CC. CA may have a plurality of serving cells. The plurality of serving cells may consist of one primary serving cell (PCell) and at least one secondary serving cell (SCell). PUCCH transmission, random access procedure, etc., may be performed only in the PCell.

Figure 6:
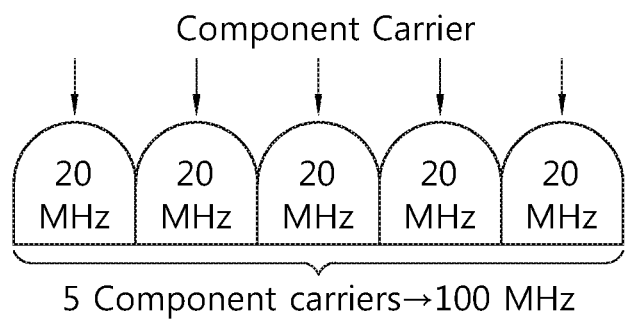
FIG. 6 shows an example of a carrier aggregation of 3GPP LTE-A.

FIG. 6 shows an example of a carrier aggregation of 3GPP LTE-A. Referring to FIG. 6, each CC has a bandwidth of 20 MHz, which is a bandwidth of 3GPP LTE. Up to 5 CCs or more may be aggregated, so maximum bandwidth of 100 MHz or more may be configured.

CA is supported for both contiguous and non-contiguous CCs with each CC limited to a maximum of 110 RBs in the frequency domain using the Rel-8/9 numerology.

It is possible to configure a UE to aggregate a different number of CCs originating from the same eNB and of possibly different bandwidths in the UL and the DL. The number of DL CCs that can be configured depends on the DL aggregation capability of the UE. The number of UL CCs that can be configured depends on the UL aggregation capability of the UE. In typical TDD deployments, the number of CCs and the bandwidth of each CC in UL and DL is the same. A number of TAGs that can be configured depends on the TAG capability of the UE.

CCs originating from the same eNB need not to provide the same coverage.

CCs shall be LTE Rel-8/9 compatible. Nevertheless, existing mechanisms (e.g., barring) may be used to avoid Rel-8/9 UEs to camp on a CC.

The spacing between center frequencies of contiguously aggregated CCs shall be a multiple of 300 kHz. This is in order to be compatible with the 100 kHz frequency raster of Rel-8/9 and at the same time preserve orthogonality of the subcarriers with 15 kHz spacing. Depending on the aggregation scenario, the n×300 kHz spacing can be facilitated by insertion of a low number of unused subcarriers between contiguous CCs.

For TDD CA, the downlink/uplink configuration is identical across component carriers in the same band and may be the same or different across component carriers in different bands.

Dual connectivity is described.

Figure 7:
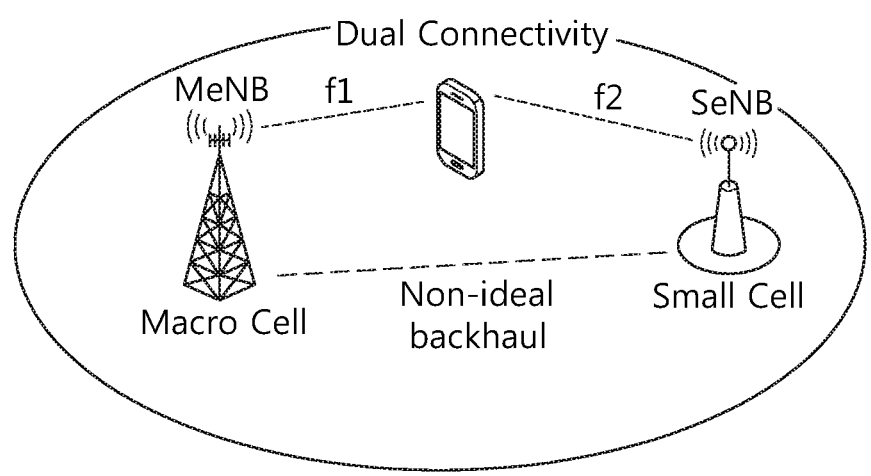
FIG. 7 shows an example of dual connectivity to a macro cell and a small cell.

FIG. 7 shows an example of dual connectivity to a macro cell and a small cell. Referring to FIG. 5, the UE is connected to both the macro cell and the small cell. A macro cell eNB serving the macro cell is the MeNB in dual connectivity, and a small cell eNB serving the small cell is the SeNB in dual connectivity. The MeNB is an eNB which terminates at least S1-MME and therefore act as mobility anchor towards the CN in dual connectivity. If a macro eNB exists, the macro eNB may function as the MeNB, generally. The SeNB is an eNB providing additional radio resources for the UE, which is not the MeNB, in dual connectivity. The SeNB may be generally configured for transmitting best effort (BE) type traffic, while the MeNB may be generally configured for transmitting other types of traffic such as VoIP, streaming data, or signaling data. In the dual connectivity, the UE may configured with one carrier group per each eNB in which all the carriers are configured with one PUCCH carrier where all HARQ-ACK and feedback are transmitted from carriers configured by one eNB.

The interface between the MeNB and SeNB is called Xn interface. The Xn interface is assumed to be non-ideal, i.e., the delay in Xn interface could be up to 60 ms.

Uplink power control according to the current specification of 3GPP LTE is described. It may be referred to Section of 5.1 of 3GPP TS 36.213 V11.3.0 (2013-06). For PUSCH, the transmit power $\hat{P}_{PUSCH,c}(i)$ is first scaled by the ratio of the number of antennas ports with a non zero PUSCH transmission to the number of configured antenna ports for the transmission scheme. The resulting scaled power is then split equally across the antenna ports on which the non-zero PUSCH is transmitted. For PUCCH or sounding reference signal (SRS), the transmit power $\hat{P}_{PUCCH}(i)$ or $\hat{P}_{SRS,c}(i)$ is split equally across the configured antenna ports for PUCCH or SRS. $\hat{P}_{SRS,c}(i)$ is the linear value of $P_{SRS,c}(i)$.

Uplink power control for the PUSCH is described. The setting of the UE transmission power for a PUSCH transmission may be defined as follows. If the UE transmits PUSCH without a simultaneous PUCCH for the serving cell c, then the UE transmit power $P_{PUSCH,c}(i)$ for PUSCH transmission in subframe i for the serving cell c may be given by Equation 1.

$$P_{PUSCH,c}(i) = \min\left\{\begin{array}{l} P_{CMAX,c}(i), \\ 10\log_{10}(M_{PUSCH,c}(i)) + P_{O\_PUSCH,c}(j) + \\ \alpha_c(j)\cdot PL_c + \Delta_{TF,c}(i) + f_c(i) \end{array}\right\}[\text{dBm}] \quad \text{<Equation 1>}$$

If the UE transmits PUSCH simultaneous with PUCCH for the serving cell c, then the UE transmit power $P_{PUSCH,c}(i)$ for the PUSCH transmission in subframe i for the serving cell c may be given by Equation 2.

$$P_{PUSCH,c}(i) = \min\left\{\begin{array}{l} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j)\cdot PL_c + \Delta_{TF,c}(i) + f_c(i) \end{array}\right\}[\text{dBm}] \quad \text{<Equation 2>}$$

If the UE is not transmitting PUSCH for the serving cell c, for the accumulation of transmit power control (TPC) command received with DCI format 3/3A for PUSCH, the UE shall assume that the UE transmit power $P_{PUSCH,c}(i)$ for the PUSCH transmission in subframe i for the serving cell c may be computed by Equation 3.

$$P_{PUSCH,c}(i) = \min\{P_{CMAX,c}(i), P_{O\_PUSCH,c}(1) + \alpha_c(1)\cdot PL_c + f_c(i)\}[\text{dBm}] \quad \text{<Equation 3>}$$

In equations described above, $P_{CMAX,c}(i)$ is the configured UE transmit power in subframe i for serving cell c and $\hat{P}_{CMAX,c}(i)$ is the linear value of $P_{CMAX,c}(i)$. $\hat{P}_{PUCCH}(i)$ is the linear value of $P_{PUCCH}(i)$ described below. $M_{PUSCH,c}(i)$ is the bandwidth of the PUSCH resource assignment expressed in number of resource blocks valid for subframe i and serving cell c. $P_{O\_PUSCH,c}(j)$ is a parameter composed of the sum of a component $P_{O\_NOMINAL\_PUSCH,c}(j)$ provided from higher layers for j=0 and 1 and a component $P_{O\_UE\_PUSCH,c}(j)$ provided by higher layers for j=0 and 1 for serving cell c. $PL_c$ is the downlink pathloss estimate calculated in the UE for serving cell c in dB and PLc=referenceSignalPower—higher layer filtered reference signal received power (RSRP), where referenceSignalPower is provided by higher layers and RSRP and the higher layer filter configuration are defined for the reference serving cell. If serving cell c belongs to a timing advance group (TAG) containing the primary cell then, for the uplink of the primary cell, the primary cell is used as the reference serving cell for determining referenceSignalPower and higher layer filtered RSRP. For the uplink of the secondary cell, the serving cell configured by the higher layer parameter pathlosSReferenceLinking is used as the reference serving cell for determining referenceSignalPower and higher layer filtered RSRP. If serving cell c belongs to a TAG not containing the primary cell then serving cell c is used as the reference serving cell for determining referenceSignalPower and higher layer filtered RSRP.

If the total transmit power of the UE would exceed $\hat{P}_{CMAX}(i)$, the UE may scale $\hat{P}_{PUSCH,c}(i)$ for the serving cell c in subframe i such that Equation 4 is satisfied.

$$\sum_c w(i)\cdot \hat{P}_{PUSCH,c}(i) \leq (\hat{P}_{CMAX}(i) - \hat{P}_{PUCCH}(i)) \quad \text{<Equation 4>}$$

In Equation 4, $\hat{P}_{PUSCH,C}(i)$ is the linear value of $P_{PUCCH}(i)$, $\hat{P}_{PUSCH,C}(i)$ is the linear value of $P_{PUSCH,c}(i)$, $\hat{P}_{CMAX}(i)$ is the linear value of the UE total configured maximum output power $P_{CMAX}$ in subframe i and w(i) is a scaling factor of $\hat{P}_{PUSCH,C}(i)$ for serving cell c where 0≤w(i)≤1. In case there is no PUCCH transmission in subframe i, $\hat{P}_{PUCCH}(i)=0$.

If the UE has PUSCH transmission with uplink control information (UCI) on serving cell j and PUSCH without UCI in any of the remaining serving cells, and the total transmit power of the UE would exceed $\hat{P}_{CMAX}(i)$ the UE may scale $\hat{P}_{PUSCH,C}(i)$ for the serving cells without UCI in subframe i such that Equation 5 is satisfied.

$$\sum_{c \neq j} w(i) \cdot \hat{P}_{PUSCH,c}(i) \leq (\hat{P}_{CMAX}(i) - \hat{P}_{PUSCH,j}(i)) \qquad \text{<Equation 5>}$$

$\hat{P}_{PUSCH,c}(i)$ is the PUSCH transmit power for the cell with UCI and w(i) is a scaling factor of $\hat{P}_{PUSCH,c}(i)$ for serving cell c without UCI. In this case, no power scaling is applied to $\overline{P}_{PUSCH,j}(i)$ unless $$\sum_{c \neq j} w(i) \cdot \hat{P}_{PUSCH,c}(i) = 0$$

and the total transmit power of the UE still would exceed $\hat{P}_{CMAX}(i)$ Note that w(i) values are the same across serving cells when w(i)>0 but for certain serving cells w(i) may be zero.

If the UE has simultaneous PUCCH and PUSCH transmission with UCI on serving cell j and PUSCH transmission without UCI in any of the remaining serving cells, and the total transmit power of the UE would exceed $\hat{P}_{CMAX}(i)$, the UE may obtain $\hat{P}_{PUSCH,c}(i)$ according to Equation 6.

$$\hat{P}_{PUSCH,j}(i) = \min(\hat{P}_{PUSCH,j}(i), (\hat{P}_{CMAX}(i) - \hat{P}_{PUCCH}(i))) \qquad \text{<Equation 6>}$$

$$\sum_{c \neq j} w(i) \cdot \hat{P}_{PUSCH,c}(i) \leq (\hat{P}_{CMAX}(i) - \hat{P}_{PUCCH}(i) - \hat{P}_{PUSCH,j}(i))$$

If the UE is configured with multiple TAGs, and if the PUCCH/PUSCH transmission of the UE on subframe i for a given serving cell in a TAG overlaps some portion of the first symbol of the PUSCH transmission on subframe i+1 for a different serving cell in another TAG, the UE shall adjust its total transmission power to not exceed $P_{CMAX}$ on any overlapped portion.

If the UE is configured with multiple TAGs, and if the PUSCH transmission of the UE on subframe i for a given serving cell in a TAG overlaps some portion of the first symbol of the PUCCH transmission on subframe i+1 for a different serving cell in another TAG, the UE shall adjust its total transmission power to not exceed $P_{CMAX}$ on any overlapped portion.

If the UE is configured with multiple TAGs, and if the SRS transmission of the UE in a symbol on subframe i for a given serving cell in a TAG overlaps with the PUCCH/PUSCH transmission on subframe I or subframe i+1 for a different serving cell in the same or another TAG, the UE shall drop SRS if its total transmission power exceeds $P_{CMAX}$ on any overlapped portion of the symbol.

If the UE is configured with multiple TAGs and more than 2 serving cells, and if the SRS transmission of the UE in a symbol on subframe i for a given serving cell overlaps with the SRS transmission on subframe i for a different serving cell(s) and with PUSCH/PUCCH transmission on subframe i or subframe i+1 for another serving cell(s), the UE shall drop the SRS transmissions if the total transmission power exceeds $P_{CMAX}$ on any overlapped portion of the symbol.

If the UE is configured with multiple TAGs, the UE shall, when requested by higher layers, to transmit physical random access channel (PRACH) in a secondary serving cell in parallel with SRS transmission in a symbol on a subframe of a different serving cell belonging to a different TAG, drop SRS if the total transmission power exceeds $P_{CMAX}$ on any overlapped portion in the symbol.

If the UE is configured with multiple TAGs, the UE shall, when requested by higher layers, to transmit PRACH in a secondary serving cell in parallel with PUSCH/PUCCH in a different serving cell belonging to a different TAG, adjust the transmission power of PUSCH/PUCCH so that its total transmission power does not exceed $P_{CMAX}$ on the overlapped portion.

Uplink power control for the PUCCH is described. If serving cell c is the primary cell, the setting of the UE transmission power $P_{PUCCH}$ for the PUCCH transmission in subframe i may be defined by Equation 7.

$$P_{PUCCH}(i) = \qquad \text{<Equation 7>}$$
$$\min \left\{ \begin{array}{c} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{array} \right\} [dBm]$$

If the UE is not transmitting PUCCH for the primary cell, for the accumulation of TPC command received with DCI format 3/3A for PUCCH, the UE shall assume that the UE transmit power $P_{PUCCH}$ for the PUCCH transmission in subframe i may be computed by Equation 8.

$$P_{PUCCH}(i) = \min\{P_{CMAX,c}(i), P_{0\_PUCCH} + PL_c + g(i)\}$$
$$[dBm] \qquad \text{<Equation 8>}$$

In equations described above, $P_{CMAX,c}(i)$ is the configured UE transmit power in subframe i for serving cell c. The parameter $\Delta_{F\_PUCCH}(F)$ is provided by higher layers. If the UE is configured by higher layers to transmit PUCCH on two antenna ports, the value of $\Delta_{TxD}(F')$ is provided by higher layers. Otherwise, $\Delta_{TxD}(F')=0$. $h(n_{CQI}, H_{HARQ}, n_{SR})$ is a PUCCH format dependent value, where $n_{CQI}$ corresponds to the number of information bits for the channel quality information (CQI). $n_{SR}=1$ if subframe i is configured for SR for the UE not having any associated transport block for UL-SCH, otherwise $n_{SR}=0=0$. $P_{O\_PUCCH}$ is a parameter composed of the sum of a parameter $P_{O\_NOMINAL\_PUCCH}$ provided by higher layers and a parameter $P_{O\_UE\_PUCCH}$ provided by higher layers.

Hereinafter, a method for controlling uplink power according to embodiments of the present invention is described. An embodiment of the present invention may propose power control aspects when inter-site carrier aggregation is used for a UE. Inter-site carrier aggregation may be defined as that a UE is configured with multiple carriers where at least two carriers are associated with separate eNBs which may be connected by ideal backhaul or non-ideal backhaul.

Meanwhile, when a UE is configured with dual connectivity, there could be a case that MeNB and SeNB are not synchronized each other and they may not be aware of timing of each other. In that case, it is natural to allow separate configuration and separate trigger of power headroom report (PHR) and power control.

For the uplink, the power availability, or power headroom may be defined as the difference between the maximum output power and the estimated output power for UL-SCH. The power headroom may be positive as well as negative (on a dB scale), where a negative value may indicate that the network has scheduled a higher data rate than the UE can support with current power availability. The power headroom may depend on the power-control mechanism and be influenced by the interference in the system and the distance to the base stations, etc. To assist the selection of a combination of modulation-and-coding scheme (MCS) and resource size M that does not lead to the UE whose power is limited, the UE may be configured to provide regular PHRs on usage of the UE's power usage. There may be a separate transmit-power limitation for each component carrier. Thus, power headroom may be measured and reported separately for each component carrier.

Information about the power headroom (i.e. PHR) is fed back from the UE to the eNB. Type-1 PHR is provided for all component carriers (CCs) simultaneously, while Type-2 PHR is provided for the primary component carrier only.

Handling Asynchronous MeNB and SeNB Case

When PHR utilizes all the activated uplink-configured carriers for both MeNB and SeNB, this asynchronous situation may cause some confusion.

Let's assume that a PHR is triggered for MeNB at subframe n in MeNB configuration, subframe n+k or n+k+1 in SeNB configuration. Due to the fact that frame boundary may not be aligned between MeNB and SeNB, it would be possible that subframe index n+k and n+k+1 both have overlap with subframe n of MeNB.

In this case, when a UE calculated PHR values for carriers configured for SeNB needs to make a decision on which subframe would be used for PHR computation (either n+k or n+k+1). Since each subframe may have different uplink transmissions such as PUCCH, PUSCH or PUCCH/PUSCH, the reported PHR would be different as well.

In terms of reporting, it would be desirable to report the worst case. Thus, among two subframes, UE can report less power headroom value where type1 and type2 are reported for S-PCell. The similar principle can be applied to SeNB PHR reporting as well. Alternatively, a UE can select either one and report it. Or, depending on the overlap portion, subframe can be selected. Or, always, first subframe (n+k) can be selected. Another alternative, of course, can be to send better PHR. In summary, UE may report min power headroom values of two, or max power headroom value of two.

Another approach to handle SeNB maximum power is to allocate two maximum power values for SeNB. One is maximum power usable per carrier and the other one is maximum desired total power used for SeNB.

Assuming in terms of power, always SeNB will be deprioritized over MeNB, when reporting PHR, carriers configured for SeNB may use min {maximum power per carrier, maximum desired total power for SeNB} as a maximum usable power per carrier such that MeNB can obtain the information how much power headroom for SeNB is present assuming a configured maximum power for SeNB usable. Reversely, this can be applied to MeNB as well.

This approach would be useful when an eNB does not know the maximum allocated power to the other eNB for some reasons. For example, due to maximum transmit power $P_{CMAX}$ computation at UE (where power allocation may be given by ratio—power sharing ratio between carrier groups) or due to UE computation on maximum power for each carrier group, if maximum power per carrier group is not known to the network, instead of reporting maximum transmit power per-carrier $P_{CMAX,c}$, maximum power per carrier group can be also used. When reporting maximum power per carrier group, this value can be reported separately (or in addition to) from $P_{CMAX,c}$ where $P_{CMAX,c}$ will be reported following PHR reporting mechanism.

In terms of computing $P_{CMAX}$, we think that overlapped subframes needs to be considered.

Figure 8:
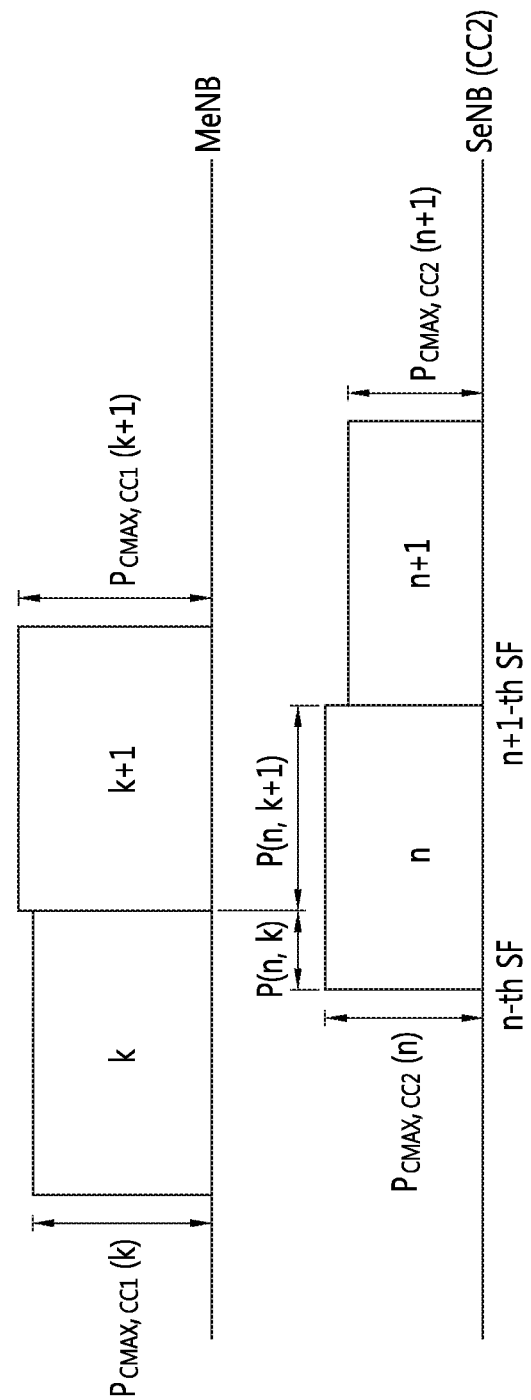
FIG. 8 briefly describes an example of obtaining maximum power considering the overlapped subframes according to the present invention(s).

FIG. 8 briefly describes an example of obtaining maximum power considering the overlapped subframes according to the present invention(s). Subframes of MeNB and SeNB are not aligned because of asynchronization. Referring to FIG. 8, the n-th subframe for SeNB is overlapped with k-th and (k+1)-th subframe for MeNB. To get the maximum power at n-th subframe for SeNB, both maximum power from (n, k) and maximum power from (n, k+1) need be considered.

To determine power limited case, $P_{CMAX}(n,k)$ and $P_{CMAX}(n, k+1)$ can be used where power limited case can be examined in two overlap period (overlap between subframe n and k and between subframe n and k+1) using $P_{CMAX}(n,k)$ and $P_{CMAX}(n, k+1)$ respectively. At least one overlap has power limited case, it is considered as the power limited case.

At the overlap portion where power limited case occurs, power scaling rule may be applied. The computed power for a uplink channel can be called as $P_{ul}(n, k)$ and $P_{ul}(n, k+1)$ for n-th subframe transmission. The power can be determined as min $\{P_{ul}(n,k), P_{ul}(n, k+1)\}$.

Figure 9:
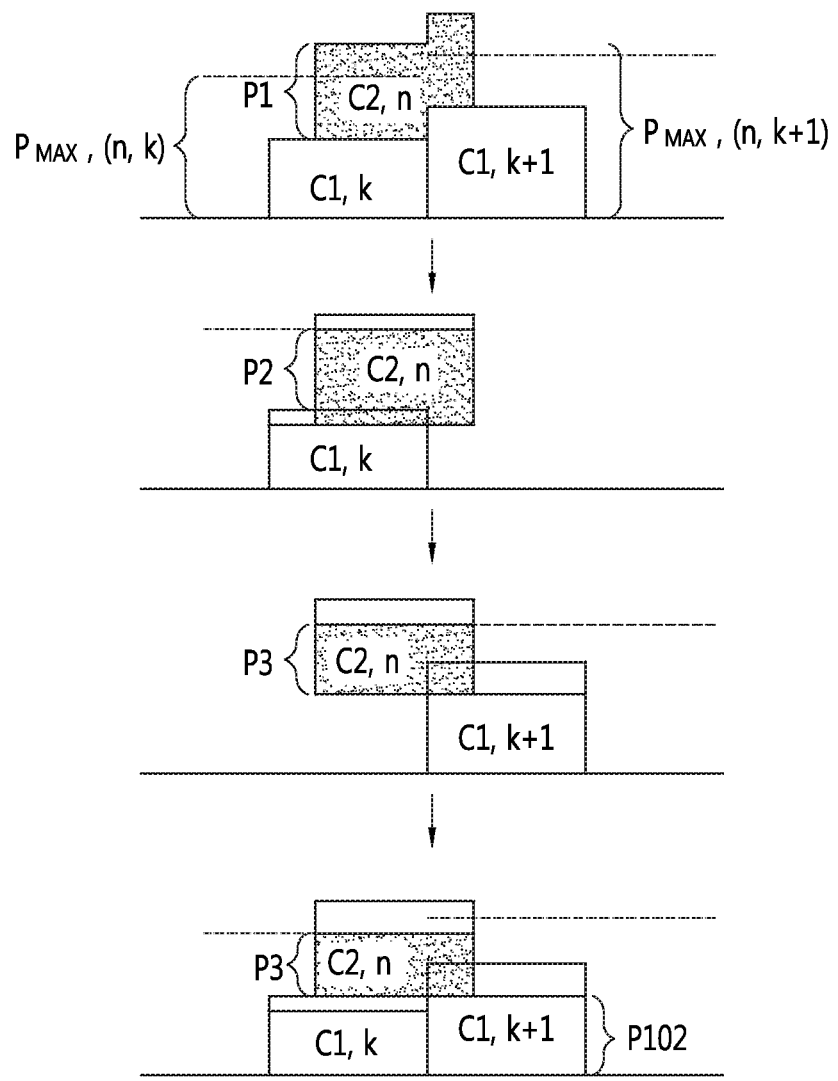
FIG. 9 briefly describes an example of power scaling according to the present invention(s).

FIG. 9 briefly describes an example of power scaling according to the present invention(s). In the example of FIG. 9, subframes of carrier C1 and carrier C2 are not aligned because of asynchronization. The power for carrier 2 (C2) at n-th subframe is determined as min {P2, P3} where P2 and P3 are determined from each overlap portion following priority rule.

That is, power for C2 for overlapped portion between n-th subframe of carrier C2 and k-th subframe of carrier C1 can be obtained as described in second figure of FIG. 9 and power for C2 for overlapped portion between n-th subframe of C2 and (k+1)-th subframe of C1 can be obtained as described in third figure of FIG. 9 when subframe of C2 and subframes of C1 are overlapped as first figure in FIG. 9. Consequently, power for C2 at n-th subframe can be determined as fourth figure in FIG. 9.

Uplink Transmission Delay

To handle power scaling on PUSCH transmission, an eNB may send "UL delay" along with UL grant such that if UL delay is triggered, a UE has flexibility to transmit PUSCH at subframe n+4 or n+5 depending on the available power. If transmission at (n+4)-th subframe has not cause any power issue, it will transmit PUSCH at (n+4)-subframe. Otherwise, it can select the better one between two subframes.

This would be useful when FDD/TDD are inter-node aggregated where FDD can wait one subframe where TDD may change its direction from UL to DL. It can be also considered (generally speaking), UL delay would be more than 1 subframe.

Handling Different Synchronous States for Power Control

In dual connectivity, depending on MeNB/SeNB configuration, a UE may experience two different cases where a UE may assume that two eNBs are synchronized so that the uplink transmission to both eNBs can occur simultaneously in the first case and a UE may experience large timing difference between two eNBs and thus uplink transmission may need to be attempted separately (from implementation perspective).

As, to support the second case (asynchronous case) the UE complexity increases, it is desirable to consider "enable" the support on asynchronous case only if needed by higher layer signaling.

Furthermore, it is also considerable to have different UE capability on "TPC support on asynchronous dual connectivity" where a UE may not support power control on asynchronous case due to its hardware complexity. This capability may also specify whether the UE supports asynchronous scenario or not in general.

In summary, a UE may report "TPC support on asynchronous scenario (or dual connectivity)" to higher layer as a capability, and a network may configure a UE to use "TPC asynchronous case" when dual connectivity is configured. If a UE is not configured with "enableTPCasync" (TPC asynchronous case), it may assume that MeNB and SeNB are synchronized. Or, a separate higher layer signaling to indicate the synchronous state between two eNBs can be feasible as well.

It is also feasible that even if a UE supports asynchronous case (in this case UE capability for reporting may be done), a UE may not want to be configured with asynchronous dual connectivity scenario depending on other configurations. For example, asynchronous dual connectivity may not be configured with ePDCCH. In this case, a UE may reject ePDCCH configuration or asynchronous dual connectivity configuration.

For synchronous scenario, the timing difference between MeNB and SeNB may be assumed to be less than a threshold.

Alternatively, a UE can assume synchronous case based on transmission timing difference of signals to PCell and pSCell. For example, if the difference is less than [33 μs], it can assume that the scenario is a synchronous case. Otherwise, it can assume that the network is asynchronized.

From the power control perspective, synchronized case means a UE applies power control mode for synchronized scenario (for example, all the remaining power is shared between two eNBs and the priority rule based on uplink control information (UCI) type is applied) whereas for asynchronous scenario is to utilize the priority rule based on earlier timing and the minimum reserved power is allocated towards the other eNB if there is potentially uplink transmission in the next overlapped subframe.

Alternatively, received timing different between PCell and pSCell and transmission timing difference to PCell and pSCell can be used to determine whether the UE applies synchronous scenario or asynchronous scenario. For example, if the received timing difference is less than 33 μs and transmission timing difference is less than [33 μs], the UE needs to assume it can perform look-ahead and thus applies priority rule based on UCI type (which is applied in synchronous scenario) on the overlapped subframes (larger overlapped one). Otherwise, it can assume asynchronous case and then applies priority rule based on transmission timing (earlier transmission gets higher priority).

When a UE determines the synchronized scenario or asynchronized scenario (or power control mode to apply) based on transmission timing difference of signals to PCell and pSCell (or signals to any cell), some conditions where transmission timing difference may change may suddenly need to be considered.

One example is to adjust timing advance (TA) based on RACH procedure (and thus absolute TA value is configured). Based on TA adjustment by RACH procedure, if the transmission timing difference becomes larger (>[33 μs]) from small value (such as [33 μs]), the UE may switch its power control mode.

Note that when a UE determines power control based on uplink transmission timing difference, it needs to be based on PUSCH or PUCCH transmission timing rather than utilizing PRACH or SRS.

Alternatively, even with TA adjustment based RACH, a UE may perform uplink timing difference based on a rather long-term scale measurements and thus, if the average transmission timing difference is still less than a threshold [33 μs], it may still consider a synchronized mode (e.g., DC power control mode used in synchronized scenario). If the average changes, it may changes its behavior.

Another approach is to determine the transmission timing difference between PCell and pSCell based on current $N_{TA}$ values or the instant transmission timing difference between PCell and pSCell. If the power control mode changes dynamically, the UE may apply the chosen power control mode in the current subframe and may change its behavior for the next subframe. For example, if subframe n of master carrier group (MCG) and subframe k and k+1 of secondary carrier group (SCG) overlap, the new DC power control may be applied starting subframe n+1 and k+2 (or k+1).

Another approach is to allow UE implementation solution to handle the switch such that when a UE is configured with SeNB or pSCell, if the transmission timing difference is less than [33 μs], the power control is determined as synchronous (otherwise, it's determined as asynchronous). Once it is determined, unless pSCell changes or deactivated, the same mode is applied. This may imply that a UE may have to support synchronous power control mode (i.e., look-ahead operation) even though the transmission timing difference becomes larger than [33 μs] at some point. A UE may trigger "error" if it cannot handle the synchronous mode (or asynchronous mode) or stop transmitting to pSCell or drop the packet to pSCell only if the power limited case occurs.

In other words, a UE may have a choice to drop packets to pSCell (or SCG) if it is determined as synchronous power control mode where the transmission timing difference becomes larger than [33 μs] and the power limited case occurs. That is, a UE can drop uplink channel(s) if it cannot apply the currently determined DC power control mode and the UE experiences power limited case.

This is particularly true if the network signals which power control mode is used. There may be two approach depending on whether the network signaling is applied.

(1) Approach 1—the network signaling approach is used.

If the network signals DC power control mode 1, a UE shall apply DC power control mode 1 as long as the transmission timing difference of signals to PCell and pSCell is equal to or less than [33 μs]. One of the following for UE behavior if the transmission timing difference of signals to PCell and pSCell is larger than [33 μs]. (i) Alt1: Same as MTA, treat this case as an error case (i.e., not transmitting uplink signals to SCG for example). (ii) Alt2: A UE may apply DC power control mode 2 in this case.

If the network signals DC power control mode 2, a UE shall apply DC power control mode 2 as long as the transmission timing difference of signals to PCell and pSCell is larger than [33 μs]. One of the following on UE behavior if the transmission timing difference of signals to PCell and pSCell is equal to or less than [33 μs]. (i) Alt1: A UE shall apply DC power control mode 2 in this case. (ii) Alt2: A UE may not apply DC power control mode 2 in this case.

(2) Approach 2

If the network signals DC power control mode 1, a UE can assume that the transmission timing difference of signals to PCell and pSCell is equal to or less than [33 μs]. UE behavior may be one of the followings if the transmission timing difference of signals to PCell and pSCell is larger than [33 μs]. (i) Alt1: Same as CA, a UE may not transmit uplink signal to SCG (ii) Alt2: A UE informs the network and UE may not transmit uplink signal to SCG If the network signals DC power control mode 2, a UE can assume that the transmission timing difference of signals to PCell and pSCell is larger than [33 μs]. UE behavior if the transmission timing difference of signals to PCell and pSCell is equal to or less than [33 µs] may be one of the followings. (i) Alt1: A UE shall apply DC power control mode 2 in this case. (ii) Alt2: A UE apply DC power control mode 2 if processing time allows or timing difference is less than [33 µs], otherwise, UE may not transmit uplink signals to SCG (iii) Alt3: A UE apply DC power control mode 2 if processing time allows or timing difference is less than [33 µs], otherwise, UE apply DC power control mode 1. (iv) Alt4: UE apply DC power control mode 2 if processing time allows or timing difference is less than [33 µs], otherwise, UE apply DC power control mode 1 and inform the network it applies DC power control mode 1. (v) Alt5: Leave to UE implementation to handle this case to determine which DC power control mode is selected. (vi) Alt6: Leave to UE implementation to handle this case, and inform the network about DC power control mode. (vii) Alt7: Leave to UE implementation including whether to drop UL to SCG or select power control.

It is up to UE implementation how to measure the transmission timing difference. When it exceeds a certain threshold such as [33 µs], it can apply asynchronous power control mode. Otherwise, it can apply sync power control mode. During the activated pSCell, the power control mode may not be changed. If it needs to be changed, it can be based on UE measurement and its up to UE implementation how to change. Alternatively, when the power limited case occurs, the UE measures the timing difference and apply either power control mode based on the transmission timing difference. Unless otherwise configured, UE should assume synchronous power control mode in case power limited case would not occur (or assume synchronous power control mode to determine power limited case).

Alternatively, a UE may change its power control mode only when TA is received (either from MCG or SCG). Even though the transmission timing difference may become larger than [33 µs] in between of TA commands, UE need not to change the power control mode. Since it applies after 6 msec from TA commands, the same subframe would be the starting subframe to apply different power control mode if the mode is changed. In other words, the same rule for applying TA needs to be used for determining determine power control mode. The timing difference is measured thus only when TA command is received.

However, it does not imply that SFN between two eNBs are aligned or frame boundary is aligned. Rather, as long as subframe boundary is aligned between MeNB and SeNB, it can be assumed as a synchronous scenario.

In case, SFN and/or frame boundary is not aligned, a UE can be configured with offset in terms of subframe offset and/or SFN offset. Alternatively, a UE may report the offset to its serving cell as well. Based on the offset, when power control is performed, the overlapped subframe is determined.

For example, if frame boundary of MeNB and SeNB has "3 subframe" offset, n-th subframe for MeNB and n+3-th subframe for SeNB are assumed as the overlapped subframe.

Also, defining synchronous case also depend on the TA value difference configured by MeNB and SeNB. Thus, the maximum difference of any TA from MeNB and any TA from SeNB should not exceed a certain threshold that a UE can handle by multiple TA mechanism. Thus, the maximum allowable TA value for each eNB may be coordinated between two eNBs.

For example, the maximum TA value for SeNB may be assumed as zero '0' whereas the maximum TA value for MeNB may be assumed as maximum TA difference in multiple TAG (such as 32.46 µs). When TA value exceeds the assigned maximum TA, either Radio Resource Control (RRC) reconfiguration is attempted to change the operation mode from synchronous TPC to asynchronous TPC or only the maximum TA is used or SeNB removal may be attempted.

More specifically, a UE supports only synchronized scenarios may inform the network TA difference becomes larger than its tolerable value such that the network may deconfigure SeNB. From the operation perspective, if uplink transmission difference between any TAG regardless of TAG belonging to MCG or SCG is larger than the tolerable value, this case can be treated as a mis-configuration or wrong scenario.

It is however notable that the difference between TA values from each eNB needs to be maintained as lower than the threshold. Thus, actual value can exceed the threshold. When a UE operates in synchronous TPC mode, upon receiving TA gap larger than the threshold, it shall inform MeNB.

For better handling of uplink power control and transmission, the configuration of asynchronous case or synchronous case is determined at SeNB addition. When SeNB is added to a UE, synchronization information is given.

When a UE is configured with asynchronous dual connectivity (i.e., MeNB and SeNB are not synchronized), the UE may have to acquire PBCH to obtain SFN information of SeNB. As some information such as dedicated PRACH resource or measurement may also depend on the knowledge on SFN information, when a UE reports measurement reports, it may also report the SFN and/or timing offset to MeNB of the identified cell (if it is different from the MeNB). In case that a UE is not able to read PBCH, dedicated signaling such as via random access response to indicate single frequency network (SFN) can be considered.

Another indication of synchronous mode and asynchronous mode can be inferred from the sum of P_MeNB (allocated power for MeNB) and P_SeNB (allocated power for SeNB). If the sum exceeds the UE total power, the UE may assume that it operates in synchronous mode whereas in other cases, the UE can assume asynchronous mode.

In terms of TPC operation in synchronous case and asynchronous case, the following (A) to (C) are different.

Figure 10:
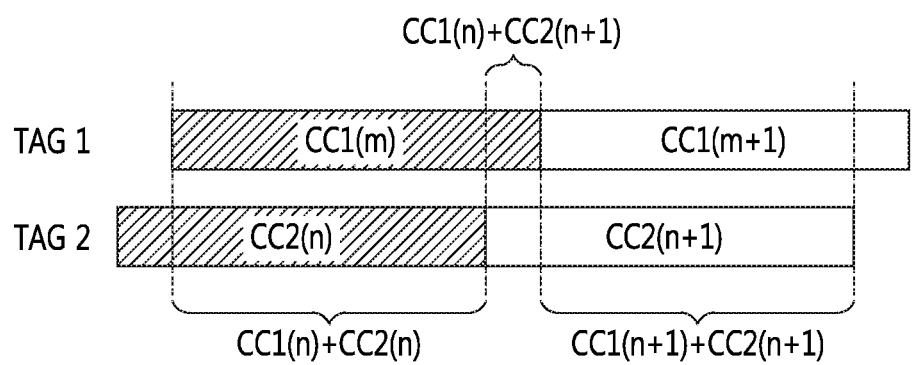
FIG. 10 describes an example of determining PCMAX in asynchronous case.

(A) $P_{Cmax}$ determination: FIG. 10 describes an example of determining $P_{CMAX}$ in asynchronous case. Referring to FIG. 10, in asynchronous case, $P_{CMAX}$ is determined by following a new rule such as $\min\{P_{CMAX}1=CC1(n)+CC2(n), P_{CMAX}2=CC1(n)+CC2(n+1), P_{CMAX}3=CC1(n+1)+CC2(n+1)\}$, whereas in synchronous case, $P_{CMAX}$ is determined per subframe n as in CA. Accordingly, power limited case definition is also affected.

(B) Power scaling: In terms of power sharing/scaling, in asynchronous case, two overlapped subframe (n, n+1) needs to be accounted for the transmission. Whereas synchronous case can utilize only subframe n.

(C) Power scaling rule/priority: In terms of priority rule, it can be the same except that in synchronous case, a UE may reduce the power during the transmission of a channel following multiple TA handling specification.

To be more generic, power control in synchronous case can be called as "mode 1 power control operation" whereas power control in asynchronous case can be called as "mode 2 power control operation". When a UE is configured with different TAG per CG, if the TA difference between different TAG exceeds the maximum tolerable TA difference (such as 32.67 µs) even though a UE is configured with mode 1 operation, it shall inform the network about the misconfiguration. Or, a UE may set the TA of SeNB=TA1 (MeNB)— maximum tolerable TA difference such that it can handle different TAGs within a tolerance.

Power Control Optimization in Synchronous Mode Operation:

Extending Rel-11 of LTE CA power control for synchronous mode needs some further considerations.

Figure 11:
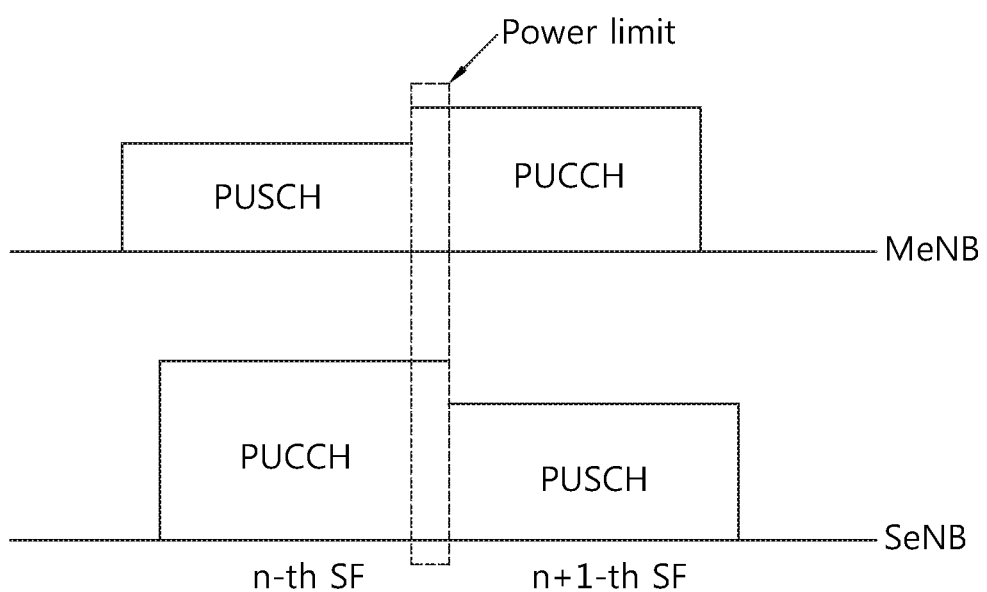
FIG. 11 briefly illustrates a case that PUCCH at (n+1)-th subframe on MeNB and PUCCH at n-th subframe on SeNB are overlapped.

FIG. 11 briefly illustrates a case that PUCCH at (n+1)-th subframe on MeNB and PUCCH at n-th subframe on SeNB are overlapped. Assuming that PUCCH has higher priority than PUSCH and MeNB has higher priority over SeNB when PUCCH and PUCCH collide in the power-limited case.

Referring to FIG. 11, since SeNB PUCCH has higher priority over PUSCH on MeNB, SeNB PUCCH can be transmitted without power scaling at n-th subframe. However, since PUCCH at n-th subframe overlaps with PUCCH on MeNB at n+1 th subframe, the power scaling in the overlapped portion is needed.

According to current existing rule (such as 3GPP LTE rel-11), a UE may adjust power not to exceed $P_{CMAX}$ in the overlapped portion which leads scaling on PUCCH in that overlapped region. To avoid the power scaling in the overlapped portion, some other mechanisms such as ①~④ can be considered.

① To determine the power of PUCCH, it shall look at both n and n+1 subframe of the other eNB (or only PUCCH on SeNB may look at n and n+1 subframe of MeNB). If there is power limited case occurs by PUCCH/PUCCH collision, according to the priority rule, PUCCH to SeNB can be dropped. In the example, PUCCH on n-th subframe can be dropped.

② A UE can be higher layer configured with using shortened PUCCH for SeNB (assuming PUCCH on MeNB has higher priority, if SeNB PUCCH has higher priority, shortened PUCCH on MeNB can be configured). Since shortened PUCCH format for PUCCH format 2 is not available, when PUCCH format 2 is transmitted in a power limited case, power scaling may be used if PUCCH is not dropped. If shortened PUCCH is configured for this matter, a UE shall use shortened PUCCH regardless of SRS transmission or SRS configuration.

③ Power scale the whole PUCCH not to exceed UE maximum power within 1 msec (i.e., during PUCCH transmission). Since the overlap portion is very small (such as 32.46 μs), if the exceeded power is scaled over the entire PUCCH transmission duration, the reduced power can be very marginal and thus the performance of impact on PUCCH may not be significant.

④ Another way is to drop the latter PUCCH in the power limited case. Assuming a UE only monitors subframe n for uplink transmission for n-th subframe, if PUCCH at n-th subframe with PUCCH at n+1 th subframe collide, n+1th subframe PUCCH can be dropped if the UE experiences power limited case. Or, power scale the whole PUCCH on n+1 th subframe PUCCH (per method ③) can be attempted where the exceeded power can be spread over the entire PUCCH transmission of n+1th subframe PUCCH. In this case, it can be generally said that transmission power of prior uplink transmission would not be changed due to the successive uplink transmissions in any condition.

For other collision cases, PUSCH/PUCCH or PUCCH/PUSCH, a UE can reduce the power in the overlapped portion not to exceed UE maximum power.

Note that a network may configure to apply multiple TA behavior in this case as well. Or, a UE may assume to apply the same behavior if the overlap portion (smaller overlap) is small. Moreover, even with configured with carrier groups, if it is within an eNB (i.e., intra-eNB CA), MTA behavior shall be followed. In other words, if a UE is configured with two carrier groups in a CA framework, if it is indicated to a UE via higher layer signaling or by other means, it shall follow MTA for that cases.

Figure 12:
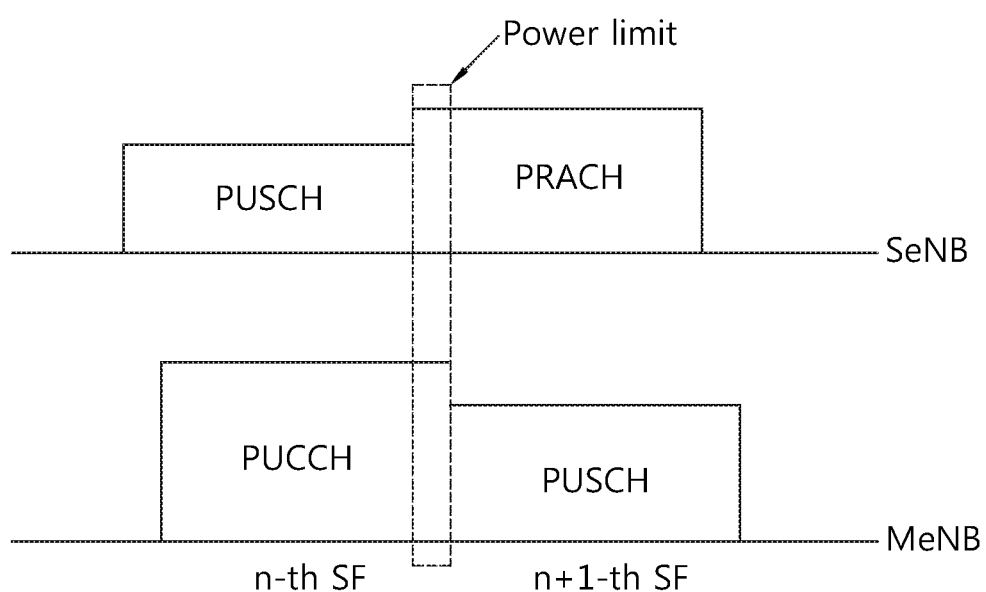
FIG. 12 briefly shows another example of a case that PUCCH and PRACH collide.

FIG. 12 briefly shows another example of a case that PUCCH and PRACH collide.

If TA value for MeNB is greater than SeNB, the overlap may not occur. However, as shown in FIG. 12, MeNB PUCCH and SeNB PRACH may collide depending on transmission timing of MeNB/SeNB and TA value settings (Similar thing can happen for MeNB PRACH as well). In this case, if PRACH has higher priority over PUCCH, MeNB PUCCH may have to be adjusted.

The similar mechanism mentioned in above can be applied in this case as well. However, since PRACH has relatively long preamble, reducing PRACH power in the overlapped portion can be also considered. In other words, a UE may reduce power (with keeping PUCCH power) in the overlapped portion. Proper TA setting may avoid this issue as well. In this case, a UE can assume that PRACH at (n+1)-th subframe may not collide with any uplink transmission in n-th subframe for the other eNB. If that occurs, UE may exceed the maximum power in the overlapped portion. Thus, any other treatment is not necessary.

Asynchronous Case Handling when UE Cannot Perform Look-Ahead

It is agreed that the first transmission can utilize the remaining power after total power allocated per CG $P_{alloc\_x\_eNB}$ is reserved for each xCG Even in this case, PRACH and SRS need to be able to perform look-ahead and thus, this discloser focuses on the PUCCH/PUSCH cases only.

When a UE knows that there will be no uplink transmissions in subframe k and k+1 (when subframe n of one eNB and subframe k and k+1 of the other eNB overlap) in the other eNB, it is able to utilize the whole remaining power.

Furthermore, considering protecting more power, it can be considered to configure a set of subframes where different $P_{alloc\_xeNB}$ can be considered. For example, in enhanced interference management and traffic adaptation (eIMTA), subframe #2 is very important to carry PUCCH whereas other subframes may be able to use low power. For subframe #2, high allocated power can be considered whereas other subframes are used with lower allocated power not to limit power to MCG unnecessarily.

Moreover, SPS PUSCH can take higher priority over first transmission as it can be considered as "scheduled" transmission. Thus, the UE can reserve some power to SPS PUSCH (i.e., give higher priority over first transmission).

For example, if n+2 subframe transmits SPS PUSCH, k+2 and k+3 of the other eNB may use power up to $P_{CMAX}$-max{$P_{alloc\_MeNB}$, SPS PUSCH power}.

Alternatively, SCG transmission may utilize the remaining power only when the UE assures that there will be no uplink transmissions to MCG in the overlapped subframes.

Determining Power Limited when UE Cannot Perform Look-Ahead

Figure 13:
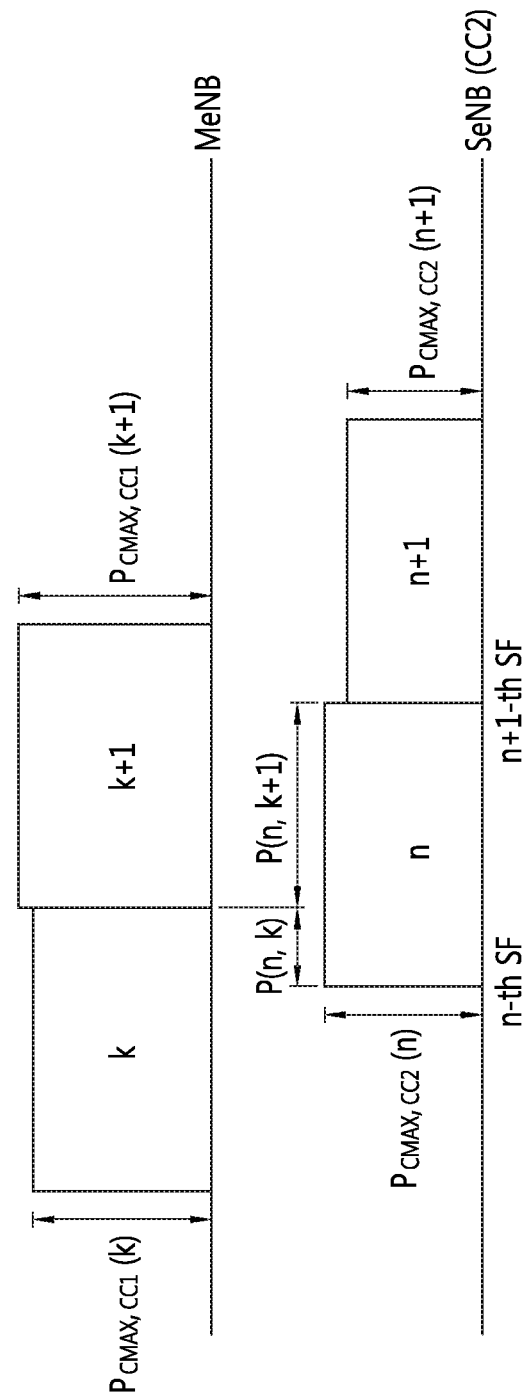
FIG. 13 briefly shows an example of an asynchronous case between MeNB and SeNB.

FIG. 13 briefly shows an example of an asynchronous case between MeNB and SeNB. In the example of FIG. 13, n-th subframe of SeNB is overlapped with k-th and (k+1)-th subframes of MeNB.

Referring to FIG. 13, to determine $P_{CMAX}$ (and determine whether the UE is power limited or not) at subframe n for SeNB, a UE needs to look at $P_{CMAX,c}$ of MeNB at subframe k and k+1. Otherwise, it may exceed UE Ppowerclass in any overlapped portion unless a UE may reduce the power or increase the power in the middle of subframe of n.

In case, a UE does not know the power of subframe k+1, the UE may assume the worst case power which is computed based on the worst case assumption. Let's make an example that $P_{CMAX,MeNB}(k)=P_k$. Then, the power may be computed by equation 9.

$$P_{PUSCH,c}(i) = \min\left\{\begin{array}{l} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array}\right\} \quad \text{<Equation 9>}$$

If the UE knows that subframe k+1 is downlink subframe, then it is accounted for the case the UE knows the power of k+1. If the UE knows that subframe k+1 is for PRACH, or corresponding to uplink transmission which is scheduled at least 4 msec before (for example, as with TDD configuration such as TDD configuration 0), or it has SPS PUSCH whose scheduling information is known to UE, the cases are not considered as look-ahead infeasible.

Look-ahead infeasible case is limited to the case where the UE does not know the power of the latter subframe between two overlapped subframes for some reasons. By any means such as by (semi)-static configuration such as DL/UL configuration, by SPS scheduling or by PRACH or by timing (the corresponding uplink grant such as PDCCH order or MAC layer indication) comes before the scheduling grant for subframe n or at least before 2.5 msec before the current subframe n, a UE may assume that it knows the power of subframe k+1.

More generally, a UE may be assumed not to be able to look-ahead subframe (k+1) if equation 10 is satisfied for starting time of (k+1)-th subframe T1 and starting time of n-th subframe T2.

$$T1-T2>\delta \quad \text{<Equation 10>}$$

Here, $\delta$ is a threshold which can be 0.5 msec or 100 μs.

Or, timing difference between two uplink carriers can be used to determine whether the UE can perform look-ahead or not.

Alternatively, received timing different between PCell and pSCell and transmission timing difference to PCell and pSCell can be used to determine whether the UE applies synchronous scenario or asynchronous scenario. For example, if the received timing difference is less than 33 μs and transmission timing difference is less than [33 μs], the UE may assume that the UE can perform look-ahead and thus applies priority rule based on UCI type on the overlapped subframes (larger overlapped one). Otherwise, the UE may assume it is an asynchronous case.

Also, whether a UE is scheduled with EPDCCH or not can be a factor as well. It can be up to the UE. However, when the information is not available, $P_{CMAX}$ can be derived based on the worst case assumption.

In case, not to make the worst case to be too extreme, the network may assure the difference between two subframes in terms of power is limited to a certain value such as A which can be configured by the network. Thus, a UE can add A as the potential power of the latter subframe between two overlapped subframes. When the power is exceeded $P_{CMAX}$ as the network may assign higher power than A, the power in the latter subframe may be reduced.

In addition, the following assumptions CD C) need to be assumed when the UE does not know the power of subframe k+1.

ⓐ $M_{PUSCH,c}(j)$ is the bandwidth of the PUSCH resource assignment expressed in number of resource blocks valid for subframe j and serving cell c. For $M_{PUSCH,c}(j)$, three alternatives can be considered. (i) Alt1: It can be assumed that $M_{PUSCH,c}(j)$ is the same as the previous subframe k. (ii) Alt2: $M_{PUSCH,c}(j)$ can be assumed as the maximum value (assume that the UE is scheduled with the entire system bandwidth). (iii) Alt3: It can be assumed that $M_{PUSCH,c}(j)$ is delta+previous subframe k value (i.e., only delta will be increased)

ⓑ Other values are assumed to be the same as previous subframe except power control adjustment factor $f_c(i)$ which is changed based on TPC. In this case, since the larger value is the important to account for, the maximum value configurable by TPC can be assumed (e.g., by accumulated TPC 3 dB and by absolute TPC of 4 dB).

ⓒ In terms of maximum power reduction (MPR) and other parameters to determine $P_{CMAX},c$ (k+1), a UE may assume the worst condition to take the minimum MPR for carrier c (for MeNB).

In general, a UE can assume the potentially worst case of power in subframe (k+1).

When P_SeNB and P_MeNB are configured as ratio of $P_{CMAX}$, as $P_{CMAX}$ may change per subframe, not to look at the latter subframe, also the worst case assumption may be needed. One simple way is to use $P_{CMAX\_L,c}$ as for the baseline of computation such that P_SeNB and P_MeNB can be decided without look-ahead.

Currently, $P_{CMAX\_L,c}$ may be determined as equation 11.

$$P_{CMAX\_L,c}=\text{MIN}\{P_{EMAX,c}-T_{C,c}, P_{Powerclass}-\text{MAX}(MPR_c+A-MPR_c+T_{IB,c}, P-MPR_c)-T_{C,c}\} \quad \text{<Equation 11>}$$

Thus, using table 2, MPR may be assumed as 2 dB in worst case. Table 2 defines an example of relationships between modulation, bandwidth and MPR.

TABLE 2

| | Channel bandwidth/Transmission bandwidth ($N_{RB}$) | | | | | | |
|---|---|---|---|---|---|---|---|
| Modulation | 1.4 MHz | 3.0 MHz | 5 MHz | 10 MHz | 15 MHz | 20 MHz | MPR (dB) |
| QPSK | >5 | >4 | >8 | >12 | >16 | >18 | ≤1 |
| 16 QAM | ≤5 | ≤4 | ≤8 | ≤12 | ≤16 | ≤18 | ≤1 |
| 16 QAM | >5 | >4 | >8 | >12 | >16 | >18 | ≤2 |

When a UE supports non-contiguous UL (and the network may configure whether it will use it or not at least in asynchronous case for MPR estimation), MPR can be CEIL{$M_A$, 0.5} means rounding upwards to closest 0.5 dB, i.e. MPR∈[3.0, 3.5 4.0 4.5 5.0 5.5 6.0 6.5 7.0 7.5 8.0]. Thus, 8.0 dB can be assumed as the worst case.

Or, if the UE cannot do look-ahead, it can be assumed that non-contiguous transmission is not scheduled and thus MPR does not need to be accounted for.

MPR may be assumed to be known based on CA or DC band combination. In this case, MPR can be assumed as the worst value as well.

Tolerance $T_{IB,c}$ can be assumed to be known as well. It can be different based on $P_{CMAX}$ as shown in table 3.

TABLE 3

| $P_{CMAX}$ (dBm) | Tolerance T ($P_{CMAX}$) (dB) |
|---|---|
| 21 ≤ $P_{CMAX}$ ≤ 23 | 2.0 |
| 20 ≤ $P_{CMAX}$ < 21 | 2.5 |
| 19 ≤ $P_{CMAX}$ < 20 | 3.5 |

TABLE 3-continued

| $P_{CMAX}$ (dBm) | Tolerance T ($P_{CMAX}$) (dB) |
|---|---|
| $18 \le P_{CMAX} < 19$ | 4.0 |
| $13 \le P_{CMAX} < 18$ | 5.0 |
| $8 \le P_{CMAX} < 13$ | 6.0 |
| $-40 \le P_{CMAX} < 8$ | 7.0 |

Since, MPR can be determined by the UE, MPR can be fixed regardless of subframe. Yet, the worst case may be assumed. For example, the same value can be taken from the previous subframe.

Thus, though the actual value may change, in terms of computing $P_{CMAX}$, the worst case may be assumed close to $P_{CMAX,L}$ (or the worst of $P_{CMAX,L}$), then this value is used for computing P_SeNB/P_MeNB in case look-ahead is not feasible.

The worst case for P-MPR can be also assumed. And $P_{CMAX,H,c}$ is determined as $P_{CMAX\_H,c}$=MIN {$P_{EMAX,c}$, $P_{Powerclass}$}

In case, look-ahead is not feasible, $P_{CMAX,c2}(n)$ is computed as min {$P_{CMAX}-P_{CMAX,c1}(k)$, $P_{CMAX,c2}(n)$}. In other words, the maximum power usable for a carrier c2, is bounded by the power not used by previous transmission. This would be very inefficient power usage.

So, a UE is not expected to exceed $P_{powerclass}$ in any time, and $P_{CMAX}$ is computed based on existing equation 12 and the power used by previous subframe (or the same subframe or the subframe corresponding to the same subframe).

$$P_{CMAX\_L\_CA}(n,k)=\text{MIN}\{10 \quad \log_{10}\Sigma\text{MIN}[P_{EMAX,c}/(t_{C,c}),P_{PowerClass}/(mpr_c \cdot a-mpr_c \cdot t_{C,c} \cdot t_{IB,c}(n \text{ or } k)),$$

$$P_{CMAX}(n,k)=\min\{P_{CMAX}(n,k),\text{estimated}\_P_{CMAX}(n,k+1)\} \quad \text{<Equation 12>}$$

In equation 12, estimated_$P_{CMAX}$ is based on the worst case assumption.

Figure 14:
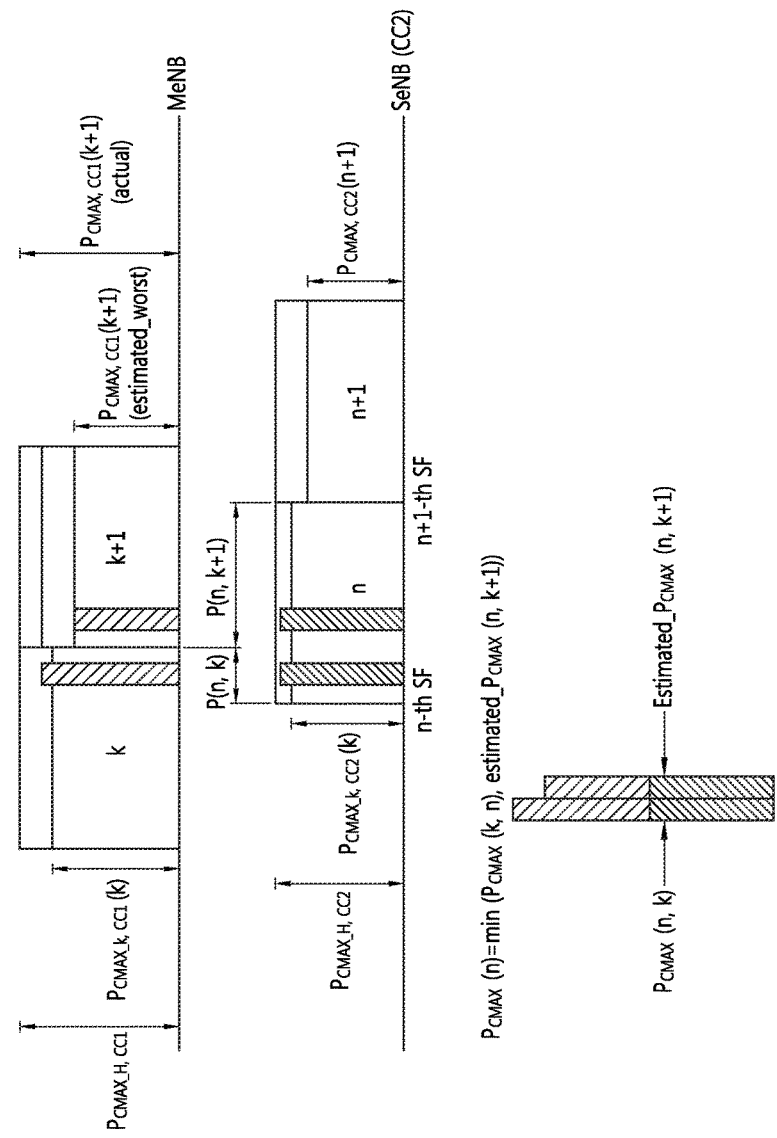
FIG. 14 briefly describes behavior of determining PCMAX.

FIG. 14 briefly describes behavior of determining $P_{CMAX}$.

In summary, for $P_{CMAX}$ computation, when look-ahead is not feasible, we propose to assume the worst MPR related to MCS and not support non-contiguous UL transmission.

Particularly this may be applicable for intra-band non-contiguous carriers are used between MeNB and SeNB uplink transmissions. Furthermore, it can be also considered to disable non-contiguous UL transmission in dual connectivity (at least for asynchronous case where the overlap portion (smaller) is larger than X (e.g., 33 μs) or timing difference between two uplink transmissions is larger than X (e.g., 33 μs)).

Simple Computation Limited to One Subframe Pair

If look-ahead is not feasible, a UE may not take subframe (k+1) into account for the computation. The next subframe will reduce the power lower than $P_{CMAX}$. In other words, power limited case always is determined based on subframe (n, k). To determine the overlapped subframe for power computation and determining power limited case (to determine "k" which is the overlapped subframe), a few mechanisms can be considered such as (a) to (e).

(a) k-th subframe is always the first overlapped subframe.
(b) k-th subframe is the subframe which has larger overlap portion between two overlapped subframes. (c) k-th subframe is the second overlapped subframe if the overlapped portion (smaller one) is less than X (e.g., 33 μs), otherwise, k-th subframe is the first overlapped subframe. (d) 'k' is determined by offset configured by higher layer between MeNB and SeNB (e.g., k=n+offset). (e) It is up to UE to determine k When k is decided for subframe n, this invention discusses how to apply P_SeNB and P_MeNB respectively. Using the previous diagram example, let's call $P_{CMAX}(n, k)$ and $P_{CMAX}(n, k+1)$ where $P_{CMAX}(n, k+1)$ is determined by subframe n and subframe k+1.

When the ratio is given, for subframe n (SeNB), the Power to SeNB is determined by a few alternatives 1) to 5) (for example, P_SeNB=50%, P_MeNB=50%, $P_{CMAX}(n,k)=22$, $P_{CMAX}(n-1, k)=21$, $P_{CMAX}(n, k+1)=21$).

1) Power_SeNB=min {$P_{CMAX}(n, k)$*P_SeNB, $P_{CMAX}(n-1, k)$*P_SeNB}

Since $P_{CMAX}(n-1, k)$ may be smaller than $P_{CMAX}(n,k)$, it can take the minimum between the two—This would not interfere with power allocated to MeNB in subframe k-1.

2) Power_SeNB=max {$P_{CMAX}(n, k)$*P_SeNB, $P_{CMAX}(n-1, k)$*P_SeNB}

This may interfere with power allocated to MeNB, since this may not guarantee the UE power less than $P_{CMAX}$ always. Thus, this needs be used with some relaxation of UE maximum power (such as less than $P_{powerclass}$)

3) Power_SeNB=$P_{CMAX}(n,k)$*P_SeNB

Similar to 2), this would cause some power issue.

4) Power_SeNB=min($P_{CMAX}$-PowerUsedbyMeNB(n-1, $P_{CMAX}(n,k)$*P_SeNB)

To address the issue of previously allocated power to MeNB, another approach is to take minimum between (unused power by MeNB in previous subframe and power applicable to SeNB in this subframe)

5) At least for inter-band carriers, Power_SeNB=sum ($P_{CMAX,cci}(n, k)$)-3 dB can be used where cci is the carriers belonging to SeNB. This assumes that MeNB and SeNB equally partition the maximum power and $P_{CMAX}$ is affected by $P_{CMAX,c}$ equally.

The similar mechanism is applicable to Power_MeNB as well.

One more clarification regarding Power_SeNB or Power_MeNB is that it can be updated as Power_xeNB=min{Power_xeNB (computed by one of the above), sum ($P_{EMAX}$,c)} for carriers belong to xeNB. Here, $P_{EMAX,c}$ is a maximum uplink transmission power per a cell. In other words, if $P_{EMAX}$ is configured low, the total power can be adjusted accordingly. This would be useful to compute the remaining power.

Or, it can be also considered not to configure dual connectivity in the allowed power reduction i.e. additional MPR (A-MPR) applicable scenario with intra-band non-contiguous carriers assigned to MeNB and SeNB. In other words, if there is A-MPR needs to be considered between MeNB and SeNB for asynchronous case, not to complicate the computation, UE may report that dual connectivity is not supported for that carriers at least for asynchronous case.

Thus, a UE may report dual connectivity capability separately for synchronous case and asynchronous case (or look-ahead and non-look-ahead case) per band and band-combination.

Moreover, it can be also considered that intra-band contiguous or non-contiguous carriers may not be used for asynchronous dual connectivity case as it complicates the computation. In other words, only inter-band carriers can be utilized for dual connectivity scenario at least for asynchronous case to minimize the impacts from MPR of the other eNB to one eNB power.

To minimize the impact, $P_{EMAX,c}$ is configured such that $P_{CMAX\_L}$ is always lower than $P_{CMAX\_H}$ and also sum of $P_{EMAX,c}$ with tolerance does not exceed power sum considering MPR. In other words, $P_{CMAX}$ is derived based on MPR values only. In that case, at least for inter-frequency carriers, $P_{CMAX}$ change per subframe can be limited to $P_{CMAX,c-L}$.

Or, it can be also considered to limit $P_{EMAX}$ per each carrier to be lower than $P_{powerclass}$ 3 dB (if we assume only two uplink carriers).

When the small overlap portion is less than X (e.g., 33 μs), this may be applied, or always take 3) (i.e. Power_SeNB=$P_{CMAX}$(n,k)*P_SeNB) as power in the small overlap portion may be handled by UE implementation.

The same thing can be applied for MeNB computation. In this case, $P_{CMAX,c}$(k+1) is limited by $P_{CMAX}$(n,k+1)−$P_{CMAX,c}$(n). In other words, in terms of $P_{CMAX}$, the power not used by subframe n can be used for subframe k+1, or, $P_{CMAX}$(n, k).

Figure 15:
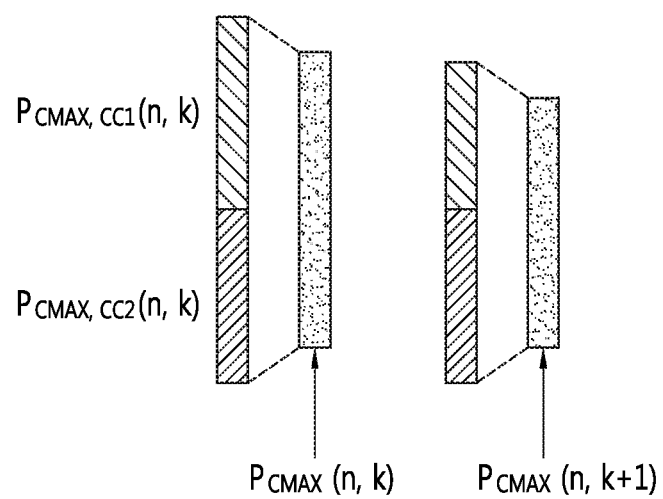
FIG. 15 briefly describes an example of handling limitation on the power considering power used in previous subframe.

FIG. 15 briefly describes an example of handling limitation on the power considering power used in previous subframe. Referring to FIG. 15, if $P_{CMAX}$(n,k+1) is smaller than $P_{CMAX}$(n,k), the power applicable to subframe (n+1) would be limited by $P_{CMAX}$(n,k+1) and power used by subframe n towards SeNB.

In summary, $P_{CMAX}$ is computed at each subframe pair such as (n,k) and the usable power can be limited to $P_{CMAX}$—used power in previous subframe.

Thus, to handle power limited case, usable power is limited by the previous subframe power usage. In summary, with P_SeNB/P_MeNB, the power limited case handles as follows a) to e).

a) At subframe (n, k) for SeNB transmission, compute Power_SeNB as one of the candidate in the above.

b) At subframe (n,k) for MeNB transmission, compute Power_MeNB=$P_{CMAX}$(n,k)*P_MeNB c) If the allocated power does not exceed Power_SeNB, transmit.

d) Otherwise, compute the power unused by $P_{CMAX}$(n, k)—power used by MeNB at (n, k−1).

e) Use up to min {$P_{CMAX,c}$, $P_{CMAX}$(n,k)−P_used_MeNB (n,k−1), $P_{CMAX}$(n,k)−Power_SeNB}

Figure 16:
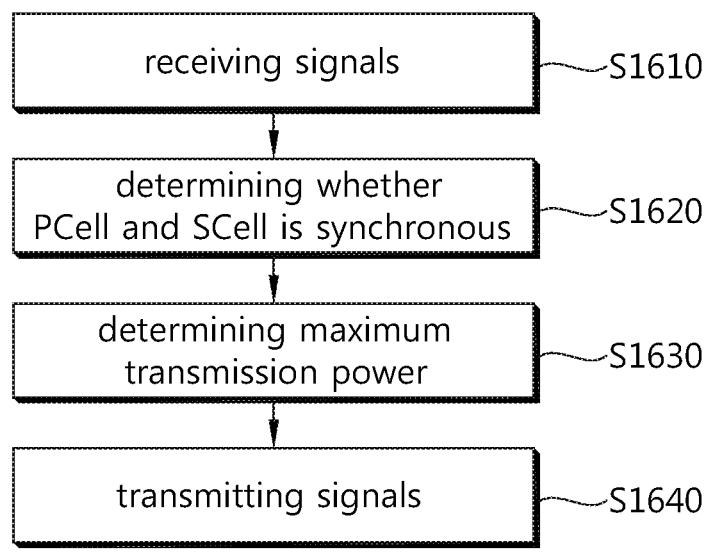
FIG. 16 is a flow chart briefly describing an example as for an operation of the UE according to the present invention(s) in this disclosure.

FIG. 16 is a flow chart briefly describing an example as for an operation of the UE according to the present invention(s) in this disclosure. In the example of the FIG. 16, the operations are described as performed by the UE in order to help to understand the invention(s) easily. However, the operation in this flow chart may be performed by a processor.

According to the FIG. 16, the UE may receive a signal on a downlink channel (S1610). Here, the signal may include information on transmission power which indicates a power control mode.

The UE may determine whether primary cell (PCell) and secondary cell (SCell) are asynchronous or synchronous (S1620).

The UE may determine maximum transmission power for the SCell (S1630). Here, the UE may determine the maximum transmission power using the information on transmission power as well as the result of determination on whether the PCell and the SCell are asynchronous or synchronous.

The subframe of the SCell may be overlapped with subframes of the PCell when the PCell and the SCell are asynchronous. In this case, power headroom for the subframe of the SCell can be determined based on one of the overlapped subframes of the PCell.

The details on determination for the maximum transmission power are same as described with figures.

The UE may transmit signal to the SCell based on the maximum transmission power for the SCell (S1640).

Figure 17:
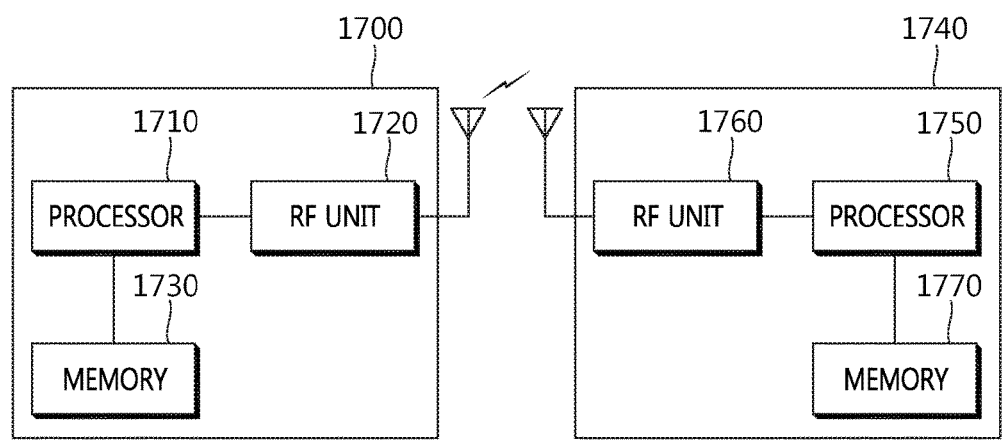
FIG. 17 is a block diagram which briefly describes a wireless communication system including an UE and a BS.

FIG. 17 is a block diagram which briefly describes a wireless communication system including an UE 1700 and a BS (eNB) 1740. The UE 1700 and the BS 1740 may operate based on the description as explained above.

In view of downlink, a transmitter may be a part of the BS 1740 and a receiver may be a part of the UE 1700. In view of uplink, a transmitter may be a part of the UE 1700 and a receiver may be a part of the BS 1740.

Referring to FIG. 17, the UE 1700 may include a processor 1710, a radio frequency (RF) unit 1720, and a memory 1730.

The processor 1710 may be configured to implement proposed procedures and/or methods described in this application. For example, the processor 1710 operatively coupled to the RF unit 1720 and the memory 1730. The processor 1710 is configured for transmitting/receiving signals via the RF unit 1720 based on a scheduling for UL and/or DL.

The processor 1710 may determine whether primary cell (PCell) and secondary cell (SCell) are asynchronous or synchronous. The processor 1710 may determine maximum transmission power for the SCell using the information on transmission power as well as the result of determination on whether the PCell and the SCell are asynchronous or synchronous.

The RF unit 1720 may transmit and receive a radio signal with transmission power allocated by the processor 1710. The RF unit 1720 receives a signal on a downlink channel in dual connectivity with master eNB (MeNB) and secondary eNB (SeNB).

The memory 1730 is coupled with the processor 1710 and stores a variety of information to operate the processor 1710.

The details on the operation of processor 1710, RF unit 1720, memory 1730 are same as describe before.

The BS 1740 may include a processor 1750, a radio frequency (RF) unit 1760, and a memory 1770.

The processor 1750 may be configured to implement proposed procedures and/or methods described in this application. For example, the processor 1750 operatively coupled to the RF unit 1760 and the memory 1770. The processor 1750 is configured for transmitting/receiving signals via the RF unit 1760 based on a scheduling for UL and/or DL.

The processor 1750 may schedule UL and/or DL and may transmit signal including information on uplink transmission power which can be used in the UE 1710. The received signal from the UE may be transmitted using the transmission power determined by the UE based on the information. Explains on this was provided before.

The RF unit 1760 may transmit and receive a radio signal, wherein transmission power for the received radio signal was allocated by the UE 1700 as explained. The RF unit 1760 receives a signal on a downlink channel in dual connectivity.

The memory 1770 is coupled with the processor 1750 and stores a variety of information to operate the processor 1750.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps.

Furthermore, the above-described embodiments include various aspects of examples. Accordingly, the present invention should be construed to include all other alternations, modifications, and changes which fall within the scope of the claims.

In the description regarding the present invention, when it is said that one element is "connected" or "coupled" to the other element, the one element may be directly connected or coupled to the other element, but it should be understood that a third element may exist between the two elements. In contrast, when it is said that one element is "directly connected" or "directly coupled" to the other element, it should be understood that a third element does not exist between the two elements.

What is claimed is:

1. A method of controlling an uplink transmission power, by a user equipment (UE), in a wireless communication system, the method comprising:
   receiving an indication of a power control mode via a higher layer from a master eNodeB (eNB) in dual connectivity;
   determining whether the MeNB and a secondary eNB (SeNB) in dual connectivity are asynchronous or synchronous with each other based on a timing difference between the MeNB and the SeNB;
   determining a transmission power for the SeNB based on the indication of the power control mode and whether the MeNB and the SeNB are asynchronous or synchronous; and
   transmitting an uplink signal to the SeNB based on the transmission power for the SeNB.

2. The method of claim 1, further comprising transmitting a UE capability on whether the UE supports an asynchronous dual connectivity or not to the eNB.

3. The method of claim 2, wherein the UE capability indicates that the UE does not support the asynchronous dual connectivity.

4. The method of claim 3, wherein the indication of the power control mode indicates a power control mode for synchronous dual connectivity.

5. The method of claim 2, wherein the UE capability indicates that the UE supports the asynchronous dual connectivity.

6. The method of claim 5, wherein the indication of the power control mode indicates a power control mode for synchronous dual connectivity or a power control mode for asynchronous dual connectivity.

7. The method of claim 1, wherein the MeNB and the SeNB are synchronous with each other when the timing difference between the MeNB and the SeNB is equal or less than a predetermined threshold value.

8. The method of claim 1, wherein the MeNB and the SeNB are asynchronous with each other when the timing difference between the MeNB and the SeNB is larger than a predetermined threshold value.

9. A user equipment (UE) in a wireless communication system, the UE comprising:
   a memory;
   a radio frequency (RF) unit; and
   a processor, coupled to the memory and the RF unit, that:
   controls the RF unit to receive an indication of a power control mode via a higher layer from a master eNodeB (eNB) in dual connectivity,
   determines whether the MeNB and a secondary eNB (SeNB) in dual connectivity are asynchronous or synchronous with each other based on a timing difference between the MeNB and the SeNB,
   determines a transmission power for the SeNB based on the indication of the power control mode and whether the MeNB and the SeNB are asynchronous or synchronous, and
   controls the RF unit to transmit an uplink signal to the SeNB based on the transmission power for the SeNB.

10. The method of claim 9, wherein the processor further controls the RF unit to transmit a UE capability on whether the UE supports an asynchronous dual connectivity or not to the eNB.

11. The method of claim 10, wherein the UE capability indicates that the UE does not support the asynchronous dual connectivity.

12. The method of claim 11, wherein the indication of the power control mode indicates a power control mode for synchronous dual connectivity.

13. The method of claim 10, wherein the UE capability indicates that the UE supports the asynchronous dual connectivity.

14. The method of claim 13, wherein the indication of the power control mode indicates a power control mode for synchronous dual connectivity or a power control mode for asynchronous dual connectivity.

15. The method of claim 9, wherein the MeNB and the SeNB are synchronous with each other when the timing difference between the MeNB and the SeNB is equal or less than a predetermined threshold value.

16. The method of claim 9, wherein the MeNB and the SeNB are asynchronous with each other when the timing difference between the MeNB and the SeNB is larger than a predetermined threshold value.

* * * * *